US010305999B2

(12) United States Patent
Hirakata

(10) Patent No.: US 10,305,999 B2
(45) Date of Patent: May 28, 2019

(54) INFORMATION PROCESSING SYSTEM, TERMINAL APPARATUS, AND PROGRAM FOR IMPROVING ACCURACY OF READ RECEIPT STATUSES

(71) Applicant: Satoru Hirakata, Kanagawa (JP)

(72) Inventor: Satoru Hirakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 432 days.

(21) Appl. No.: 14/865,155

(22) Filed: Sep. 25, 2015

(65) Prior Publication Data

US 2016/0094671 A1 Mar. 31, 2016

(30) Foreign Application Priority Data

Sep. 29, 2014 (JP) .................................. 2014-198511

(51) Int. Cl.
*H04L 12/58* (2006.01)
*H04L 29/08* (2006.01)
(Continued)

(52) U.S. Cl.
CPC .............. *H04L 67/22* (2013.01); *H04L 51/16* (2013.01); *H04L 51/34* (2013.01); *H04L 67/025* (2013.01);
(Continued)

(58) Field of Classification Search
CPC ....... H04L 67/22; H04L 67/025; H04L 51/16; H04L 51/34; H04L 21/4122;
(Continued)

(56) References Cited

U.S. PATENT DOCUMENTS

2005/0289363 A1* 12/2005 Tsirkel .................. G06F 1/3203
713/300
2006/0023915 A1* 2/2006 Aalbu ..................... G01S 13/04
382/103
(Continued)

FOREIGN PATENT DOCUMENTS

JP 2013-541777 11/2013
JP 2014-035742 2/2014
JP 2015-156199 8/2015

OTHER PUBLICATIONS

U.S. Appl. No. 14/633,486, filed Feb. 27, 2015.
Japanese Office Action for 2014-198511 dated Jul. 3, 2018.

*Primary Examiner* — Viet D Vu
(74) *Attorney, Agent, or Firm* — IPUSA, PLLC

(57) ABSTRACT

An information processing system formed by connecting an information processing apparatus with terminal apparatuses includes a delivery unit delivering information received from the terminal apparatus to the other terminal apparatus; a display unit displaying the information exchanged between the terminal apparatuses; a user detection unit detecting whether the user exists before the other terminal apparatus in a case where the information delivered from the terminal apparatus is displayed in the other terminal apparatus; a report unit sending a report indicating that the information delivered from the terminal apparatus is browsed from the other terminal apparatus, which detect that the user exists, to the terminal apparatus and not sending the report from the other terminal apparatuses, which does not detect that the user exists; and a display control unit of the terminal apparatus displaying a browsed state of the information in the other terminal apparatuses based on the report.

6 Claims, 21 Drawing Sheets

(51) Int. Cl.
  *H04N 21/41* (2011.01)
  *H04N 21/4223* (2011.01)
  *H04N 21/442* (2011.01)
  *H04N 21/475* (2011.01)
  *H04N 21/4788* (2011.01)

(52) U.S. Cl.
  CPC ..... *H04N 21/4122* (2013.01); *H04N 21/4223* (2013.01); *H04N 21/44218* (2013.01); *H04N 21/4751* (2013.01); *H04N 21/4788* (2013.01)

(58) Field of Classification Search
  CPC ........... H04L 21/4223; H04L 21/44218; H04L 21/4751; H04L 21/4788
  See application file for complete search history.

(56) References Cited

U.S. PATENT DOCUMENTS

| | | | |
|---|---|---|---|
| 2009/0049520 A1* | 2/2009 | Kubota | G06Q 10/10 726/3 |
| 2013/0198296 A1* | 8/2013 | Roy | G06Q 10/107 709/206 |
| 2013/0212202 A1 | 8/2013 | Lee | |
| 2014/0029810 A1* | 1/2014 | Barr | G06F 21/32 382/118 |
| 2015/0149574 A1 | 5/2015 | Shimomoto | |
| 2015/0161407 A1 | 6/2015 | Hirakata | |
| 2015/0163368 A1 | 6/2015 | Hashimoto | |
| 2015/0201101 A1 | 7/2015 | Kaminushi | |
| 2015/0205510 A1 | 7/2015 | Hirakata | |

* cited by examiner

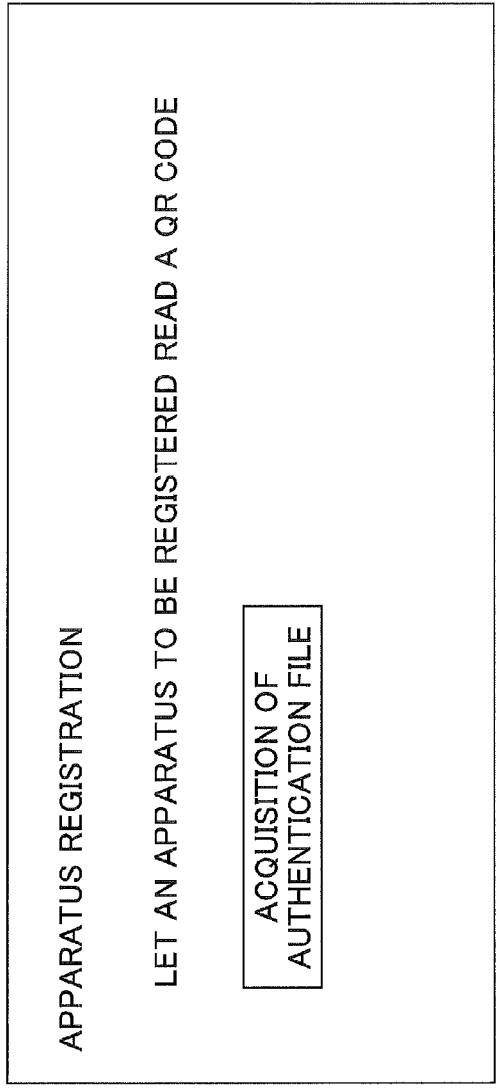

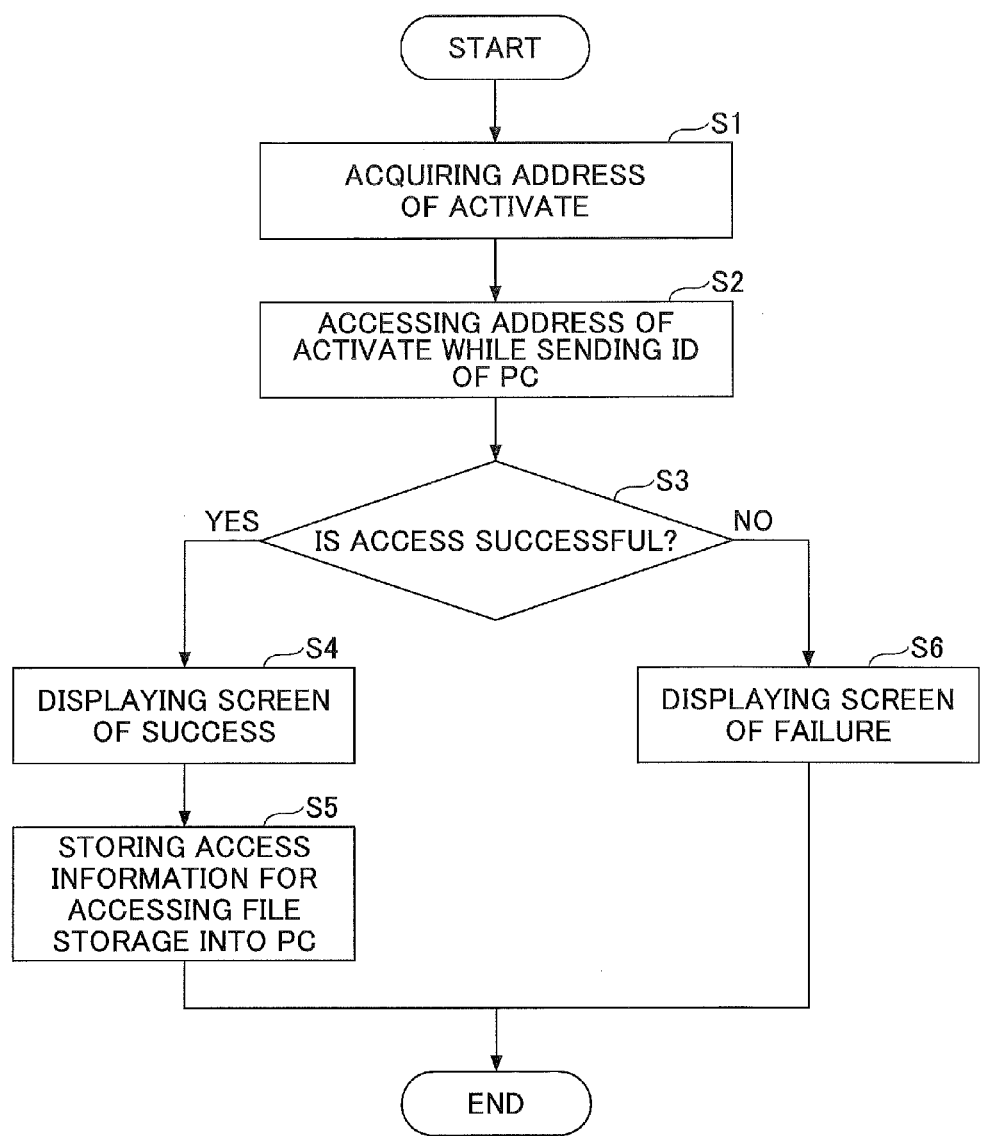

FIG.20

| GROUP ID | GROUP NAME | ATTENDING USER ID |
|---|---|---|
| 0001 | NEW FUNCTION STUDY GROUP | tanaka |
| | | satoh |
| | | itoh |
| | | matsuda |
| | | takahashi |
| 0002 | MANAGEMENT GROUP | tanaka |
| | | suzuki |
| | | yamada |
| 003 | GENERAL AFFAIRS GROUP | nakamura |
| | | kobayashi |
| | | katoh |
| | | watanabe |

FIG.21

| MESSAGE ID | ATTENDING GROUP | REMARKING PERSON ID | REMARKED TIME | ALREADY READ USER ID |
|---|---|---|---|---|
| 1000 | 0001 | tanaka | 2014/8/10 15:31 | satoh |
|  |  |  |  | itoh |
| 1001 | 0002 | suzuki | 2014/8/10 15:35 | suzuki |
| 1002 | 0001 | itoh | 2014/8/10 15:36 | tanaka |
|  |  |  |  | satoh |
| 1003 | 0001 | tanaka | 2014/8/10 15:37 | itoh |
|  |  |  |  | satoh |

FIG.22

| USER ID | APPARATUS NAME | APPARATUS ID |
|---|---|---|
| tanaka | SMART DEVICE A<br>PC-A | 101A<br>201A |
| satoh | SMART DEVICE B<br>PC-B | 101B<br>201B |
| ⋮ | ⋮ | ⋮ |

INFORMATION PROCESSING SYSTEM, TERMINAL APPARATUS, AND PROGRAM FOR IMPROVING ACCURACY OF READ RECEIPT STATUSES

BACKGROUND OF THE INVENTION

1. Field of the Invention

The present invention relates to an information processing system, a terminal apparatus, and a program.

2. Description of the Related Art

An example of a group chat in which several users can mutually have a dialogue provides a receipt confirmation with which the number of unread users for each message can be quickly determined (see, for example, Patent Document 1).

Patent Document 1: Japanese National Publication of International Patent Application No. 2013-541777

SUMMARY OF THE INVENTION

It is a general object of at least one embodiment of the present invention to provide an information processing system that substantially obviates one or more problems caused by the limitations and disadvantages of the related art.

One aspect of the embodiments of the present invention may be to provide an information processing system formed by connecting at least one information processing apparatus with a plurality of terminal apparatuses, the information processing system including a delivery unit configured to deliver information, which is used by a user and received from one terminal apparatus among the plurality of terminal apparatuses, to one or more other terminal apparatuses, which are associated with the one terminal apparatus among the plurality of terminal apparatuses; a display unit of each of the plurality of terminal apparatuses configured to display the information exchanged by the delivery unit between the plurality of terminal apparatuses; a user detection unit of the one or more other terminal apparatuses configured to detect whether the user exists before the one or more other terminal apparatuses in a case where the information, which is delivered from the one terminal apparatus through the delivery unit, is displayed in the display unit of the one or more other terminal apparatuses; a report unit configured to send a report indicating that the information, which is delivered from the one terminal apparatus through the delivery unit, is browsed from the one or more other terminal apparatuses, which detect that the user exists, to the one terminal apparatus and configured not to send the report from the one or more other terminal apparatuses, which does not detect that the user exists, to the one terminal apparatus; and a display control unit of the one terminal apparatus configured to display a browsed state of the information in the one or more other terminal apparatuses based on the report received from the one or more other terminal apparatuses.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 10 illustrates an exemplary image of WebUI acquiring an authentication file for a device registration.

FIG. 11 is an exemplary structural view of information acquired from the authentication file.

FIG. 12 is an exemplary flowchart of a PC registration process.

FIG. 20 is an exemplary structural view of a group information.

FIG. 21 is an exemplary structural view of message log information.

FIG. 22 illustrates an exemplary structure of push report destination information.

DETAILED DESCRIPTION OF THE PREFERRED EMBODIMENTS

For example, there may be a case where an information processing system where messages are exchanged between users has a function that a sender can check on a side on a send source whether a sent message is already read or unread by a send destination. In this information processing system, an already read report indicating that the sent message is already read is reported to the terminal apparatus of the send source at a timing when the sent message is displayed on the terminal apparatus of the send destination.

However, in a personal computer (PC) in which the terminal apparatus of the send destination frequently keeps an application being started up, there may be a case where the PC displays a message and returns the already read report to the send source even though the user does not browse using the PC. As described, there is a problem that a message displayed on the PC is treated as being already read even though the message is not browsed due to a reason such as leaving the seat.

A description is given below, with reference to the FIG. 1 through FIG. 27, of embodiments of the present invention. Where the same reference symbols are attached to the same parts, repeated description of the parts is omitted.

Reference symbols typically designate as follows:
1, 1A: information processing system;
11: relay server;
12: chat server;
13: push server;
14: file server;
15: firewall(FW);
16: personal computer(PC);
17: smart device;
21, 81: display unit;
22, 82: operation receiving unit;
23: two-dimensional code read unit;
24, 84: image information generation unit;
25, 85: image generation unit;
26, 88: setup memory unit;
27, 41, 55, 61, 72, 89: data send unit;
28, 42, 51, 62, 71, 90: data receipt unit;
29, 64, 91: file administration unit;
30, 92: text information generation unit;
31: message process unit;
43, 63: user and group administration unit;
44: data send destination determining unit;
52: data memory unit;
53: request reception unit;
54: data determining unit;
65: log administration unit;
66: request inquiry unit;
67: request process unit;
73: report destination determining unit;
74: device ID memory unit;
83: authentication file read unit;
86: user detection unit;
87: message process unit;
500: computer;
501: input device;
502: display device;
503: external I/F;
503a: recording medium;
504: RAM;
505: ROM;
506: CPU;
507: communication I/F;
508: HDD;
509: camera;
601: CPU;
602: ROM;
603: RAM;
604: EEPROM;
605: CMOS sensor;
606: acceleration and direction sensor;
607: record media;
608: media drive;
609: audio input unit;
610: audio output unit;
611: antenna;
612: communication unit;
613: wireless LAN communication unit;
614: short-range wireless communication antenna;
615: short-range wireless communication unit;
616: display;
617: touch panel;
618: battery;
619: bus line;
B: bus; and
N1, N2: network.

[First Embodiment]

<System Structure>

Figure 1:
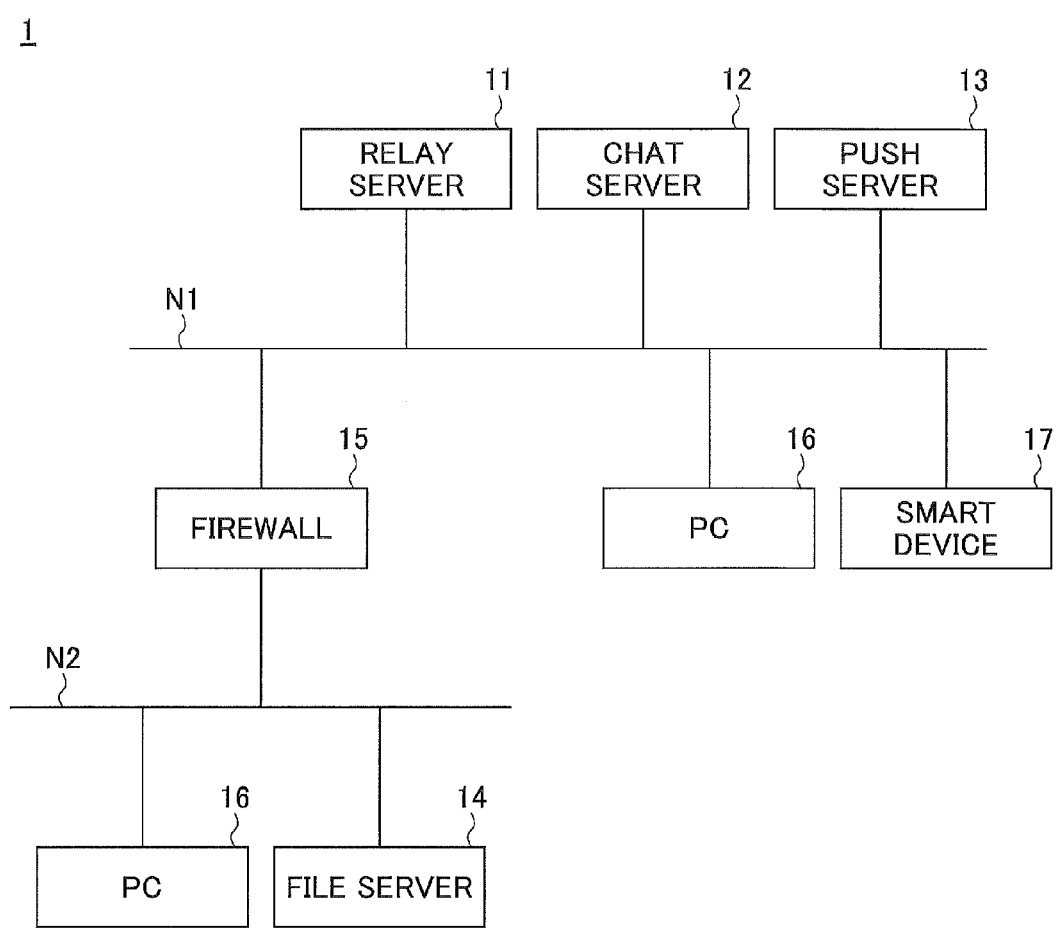
FIG. 1 illustrates an exemplary structure of an information processing system of an embodiment.

FIG. 1 illustrates a structure of an exemplary information processing system of the first embodiment. Referring to FIG. 1, the information processing system 1 includes a relay server 11, a chat server 12, a push server 13, a file server 14, a firewall (FW) 15, a personal computer (PC) 16, and a smart device 17.

The relay server 11, the chat server 12, at least a part of the PC 16, and the smart device 17 are connected to a network N1 such as the Internet. Further, the file server 14 and at least a part of the PC 16 are connected to a network N2 such as a LAN. The network N1 and the network N2 are connected through the FW 15.

The relay server 11 temporarily receives a request for the file server 14 connected to the network N2 from the chat server 12, the push server 13, the PC 16, and the smart device 17, and delivers (relays) the request to the file server 14.

The chat server 12 receives a conversational content for performing a chat between the PCs 16 and the smart device 17 or the like from the PCs 16 and the smart device 17 and delivers this conversational content or the like. The push server 13 receives a request for an already read report using a push report from the file server 14, and requests the PC 16 or the smart device 17 to send the already read report using the push report. The PC 16 and the smart device 17 are the terminal apparatus used by the user.

A file shared by users, a log of the conversational content exchanged by the users through the chat server 12, and so on are stored in the file server 14. Because the file server 14 is connected to the network N2, the relay server 11, the chat server 12, the push server 13, the PC 16, and the smart device 17, which are connected to the network N1, cannot directly access the file server 14. The file server 14 can access the relay server 11, the chat server 12, the push server 13, the PC 16, and the smart device 17, which are connected to the network N1.

The file server 14 continuously inquires the relay server 11 of whether the request is received or not. If the relay server 11 receives the request, the request is acquired from the relay server 11 and processed. Further, the file server 14 sends a processing result of processing the request to the relay server 11. The PC 16 and the smart device 17 sending the request can receive the processing result of processing the request from the relay server 11. As such, the request from the PC 16 and the smart device 17 connected to the network N1 to the file server 14 connected to the network N2 can be indirectly sent through the relay server 11.

The relay server 11, the chat server 12, the push server 13, the PC 16, and the smart device 17 are mutually communicable through the network N1. The file servers 14 and the PCs 16 connected to the network N2 are mutually communicable.

Referring to FIG. 1, the PCs 16 and the smart device 17 is an example of the terminal apparatus operated by the user.

Within the first embodiment, the PC 16 is an example of the terminal apparatus, which frequently keeps an application screen being displayed.

Further, the smart device 17 is an example of the terminal apparatus which does not frequently keep the application screen being displayed in comparison with the PC 16. The smart device 17 is, for example, a smartphone, a tablet terminal, a mobile phone, or the like.

The information processing system 1 illustrated in FIG. 1 is an example. Various system structures can be exemplified depending on a use or a purpose. For example, the relay server 11, the chat server 12, the push server 13, and the file server 14 illustrated in FIG. 1 may be structured so that processes performed by the relay server 11, the chat server 12, the push server 13, and the file server 14 are distributed to multiple computers. For example, the relay server 11, the chat server 12, and the push server 13 illustrated in FIG. 1 may be structured so that processes performed by the relay server 11, the chat server 12, and the push server 13 are integrally performed by one computer.

<Hardware Structure>

«Computer»

Figure 2:
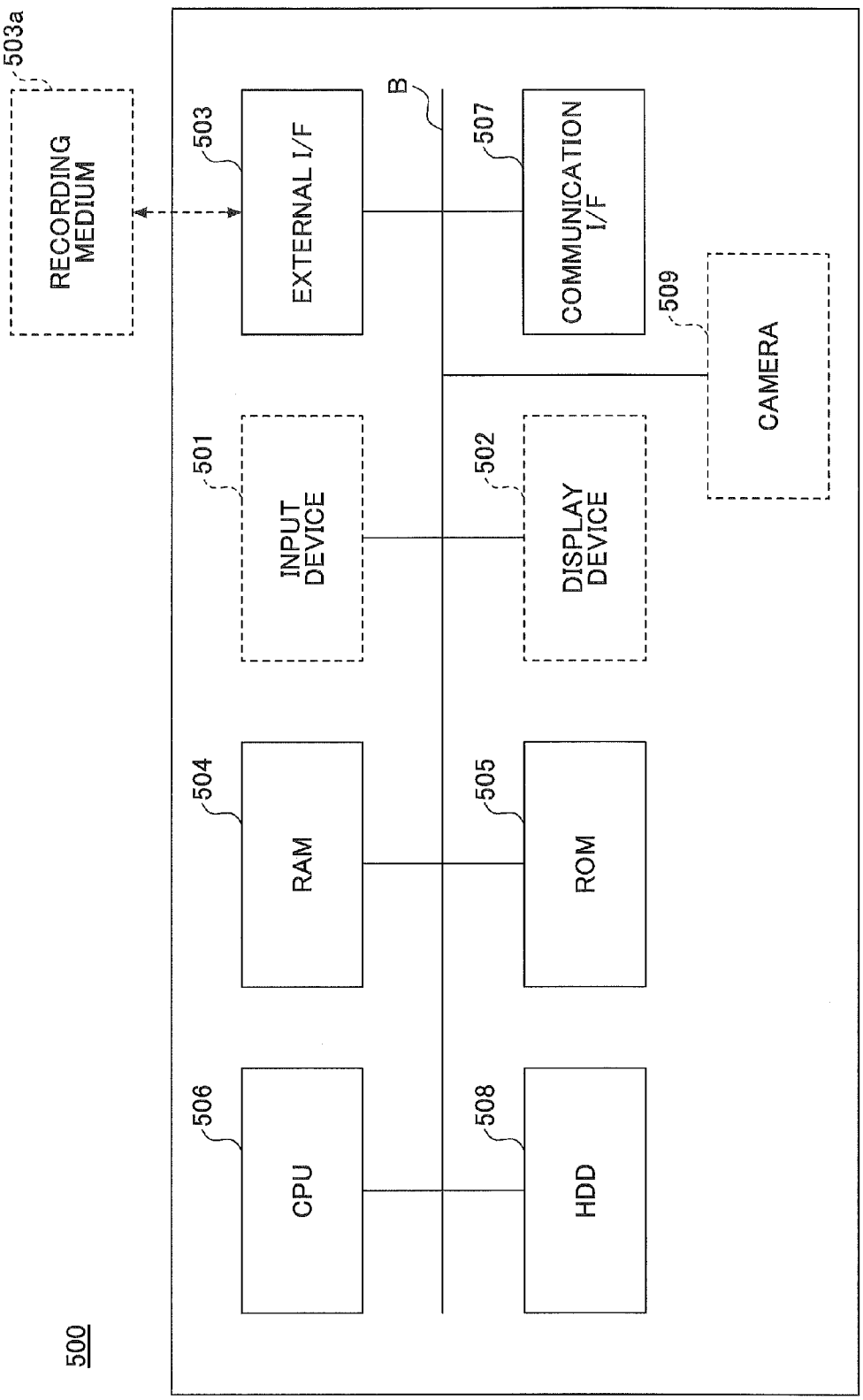
FIG. 2 illustrates an exemplary hardware structure of a computer of the embodiment.

The relay server 11, the chat server 12, the push server 13, the file server 14, and the PC 16 are substantialized by a computer having a hardware structure illustrated in, for example, FIG. 2. FIG. 2 illustrates an exemplary hardware structure of the computer of the first embodiment.

Referring to FIG. 2, the computer 500 includes an input device 501, a display device 502, an external I/F 503, a RAM 504, a ROM 505, a CPU 506, a communication I/F 507, a HDD 508, a camera 509 and so on, mutually connected by a bus B. It is acceptable to structure such that the input device 501, the display device 502, and the camera 509 are connected when necessary.

The input device 501 includes a keyboard, a mouse, or the like, by which the user inputs various operation signals. The display device 502 includes a display or the like to display a processing result obtained by the computer 500.

The communication I/F 507 is an interface provided to connect the computer 500 with the network N1 or N2. Thus, the computer 500 can perform data communications through the communication I/F 507.

The HDD 508 is an exemplary non-volatile memory device that stores a program and data. The stored program and data are an operating system (OS), which is basic software controlling the entire computer 500, application software (hereinafter, simply referred to as an "application") providing various functions in the OS, and so on. The computer 500 may use a drive device using a flash memory (e.g., a solid state drive (SSD)) as a recording medium in place of the HDD 508.

Further, the HDD 508 administers the stored program and the stored data using a predetermined file system and/or a predetermined database (DB). The camera 509 captures an image of a photographic subject in conformity with a control of the CPU 506 so as to acquire image data. The camera 509 may be built in the computer 500 or attached to the outside of the computer 500. The external I/F 503 is an interface with an external apparatus. The external apparatus is a recording medium 503a or the like.

With this, the computer 500 can read information from the recording medium 503a and/or write information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data such as basic input/output system (BIOS), OS setup, network setup, or the like, which are executed at a time of booting up the computer 500. The RAM 504 is an example of a volatile semiconductor memory (a memory device) temporarily storing the program and/or the data.

The CPU 506 is an arithmetic device that reads the program and/or the data from the memory device such as the ROM 505, the HDD 508, or the like. The read program or the read data undergo a process so as to substantialize a control or a function of the entire computer 500.

The relay server 11, the chat server 12, the push server 13, the file server 14, and the PC 16 can substantialize various processes described below using a hardware structure of the computer 500 illustrated in, for example, FIG. 2.

<Smart Device>

Figure 3:
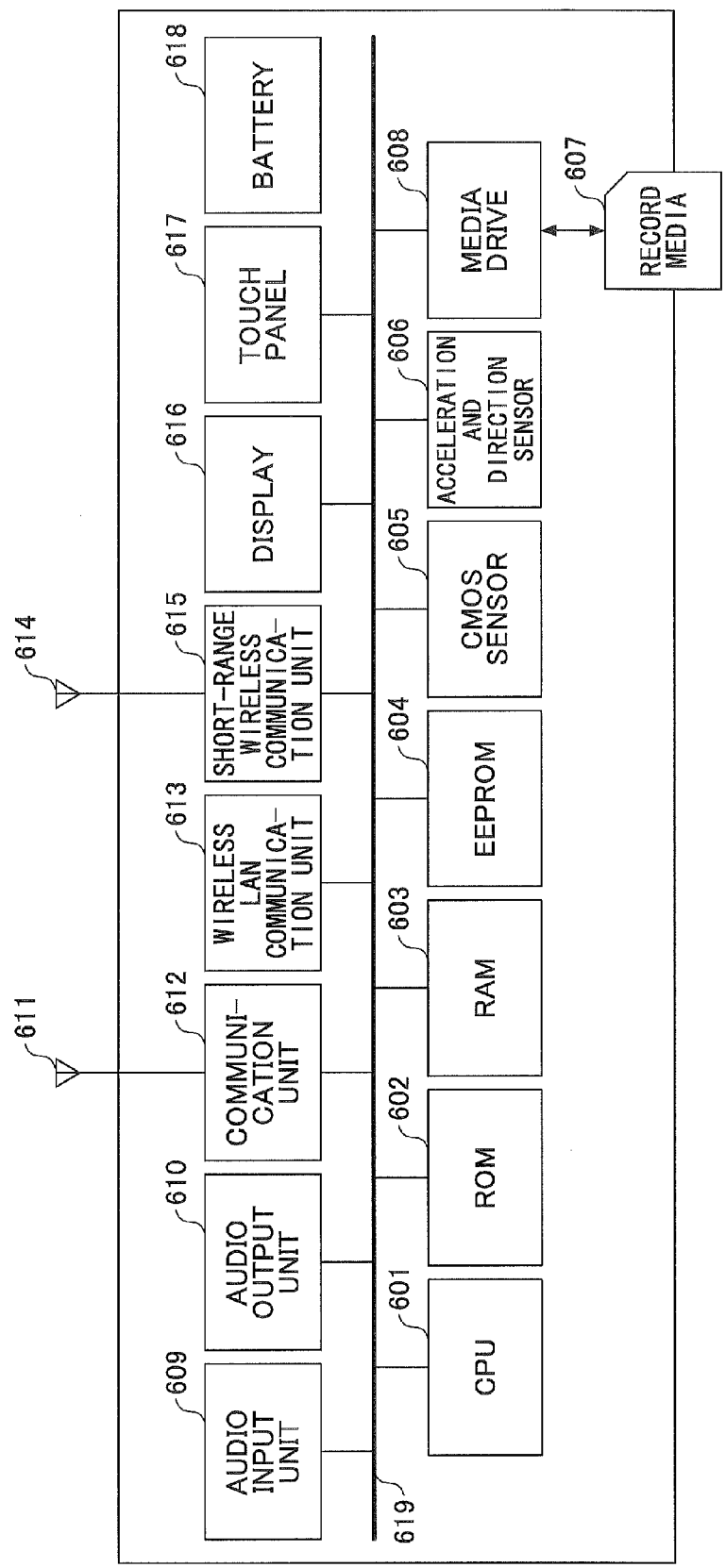
FIG. 3 illustrates an exemplary hardware structure of a smart device of the embodiment.

FIG. 3 illustrates an exemplary hardware structure of the smart device of the first embodiment. The smart device 17 illustrated in FIG. 3 includes a CPU 601, a ROM 602, a RAM 603, an EEPROM 604, a CMOS sensor 605, an acceleration and direction sensor 606, and a media drive 608.

The CPU 601 controls an operation of the entire smart device 17. The ROM 602 stores a basic input and output program. The RAM 603 is used as a work area of the CPU 601. The EEPROM 604 reads or writes data in conformity with a control of the CPU 601. The CMOS sensor 605 captures an image of the photographic subject in conformity with the control of the CPU 601 so as to acquire image data. The acceleration and direction sensor 606 is an electromagnetic compass that detects earth magnetism, a gyrocompass, an acceleration sensor, or the like.

The media drive 608 controls read or write (store) of data from or to a record media 607 such as a flash memory. Data already recorded in the record media 607 are read out or new data are written in the record media 607. The record media 607 is freely attachable to or detachable from the media drive 608.

The EEPROM 604 stores an operating system (OS) executed by the CPU 601, association information necessary for a network setup, or the like. An application for performing various processes in the first embodiment is stored in the EEPROM 604, the record media 607, or the like.

The CMOS sensor 605 is a charge-coupled device that converts light to electric charges and digitizes the image of the photographic subject. The CMOS sensor 605 may be substituted by, for example, a charge coupled device (CCD) sensor as long as the image of the photographic subject can be captured.

Further, the smart device 17 includes an audio input unit 609, an audio output unit 610, an antenna 611, a communication unit 612, a wireless LAN communication unit 613, a short-range wireless communication antenna 614, a short-range wireless communication unit 615, a display 616, a touch panel 617, and a bus line 619.

The audio input unit 609 converts a sound to an audio signal. The audio output unit 610 converts the audio signal to the sound. The communication unit 612 uses the antenna 611 to communicate with the nearest base station apparatus by a wireless communication signal. The wireless LAN communication unit 613 performs a wireless LAN communication with an access point in conformity with the standard IEEE 80411. The short-range wireless communication unit 615 performs short-range wireless communication (Bluetooth, "Bluetooth" is a registered trademark) using the short-range wireless communication antenna 614.

The display 616 is provided to display the image of the photographic subject, various icons, or the like. The display 616 is made of a liquid crystal, an organic EL, or the like. The touch panel 617 is mounted on the display 616 and is formed of a panel of a pressure sensitive type or a static type. A touch position on the display 616 is detected by a touch of a finger or a touch pen. The bus line 619 is an address bus, a data bus, or the like for electrically connecting the above units and parts.

The smart device 17 includes a battery 618 for a dedicated use. The smart device 17 is driven by the battery 618. The audio input unit 609 includes a microphone for inputting the sound. The audio output unit 610 includes a speaker for outputting the sound.

As described, the smart device 17 of the first embodiment can substantialize various processes described later with the above hardware structure.

<Software Structure>

«Smart Device»

Figure 4:
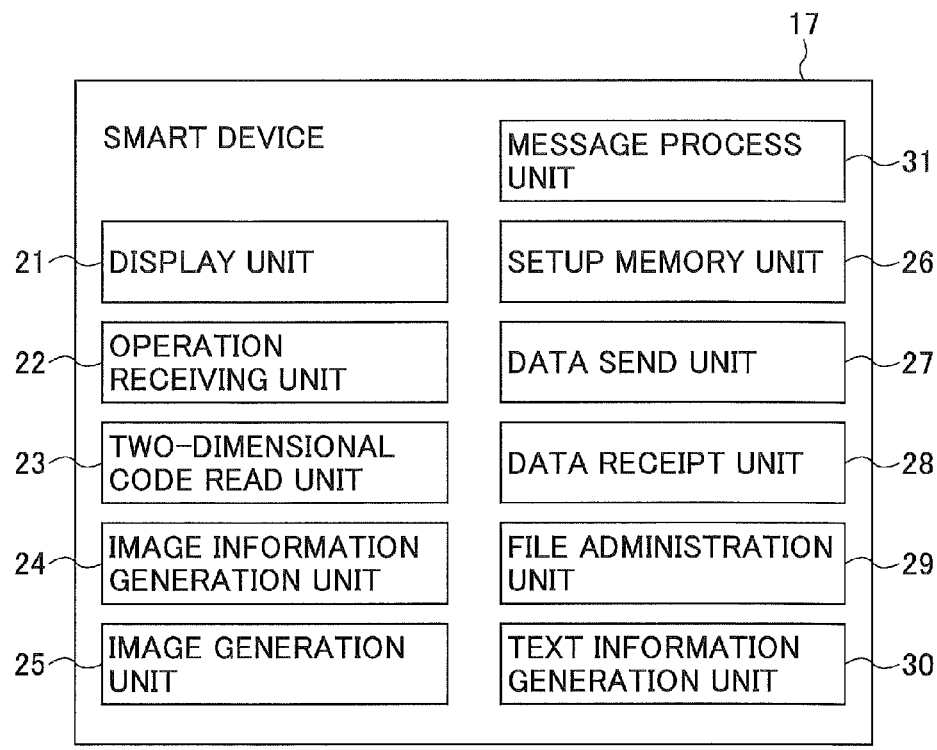
FIG. 4 is an exemplary processing block chart of the smart device of the embodiment.

The smart device 17 of the first embodiment is substantialized by the processing block illustrated in, for example, FIG. 4. FIG. 4 is an exemplary processing block chart of the smart device of the first embodiment.

The smart device 17 substantializes a display unit 21, an operation receiving unit 22, a two-dimensional code read unit 23, an image information generation unit 24, an image generation unit 25, a setup memory unit 26, a data send unit 27, a data receipt unit 28, a file administration unit 29, a text information generation unit 30, and a message process unit 31 by executing the application.

The display unit 21 displays the content of a file, a conversational content of a chat, a file selection screen, or the like. The operation receiving unit 22 receives an operation done by the user. The two-dimensional code read unit 23 reads a two-dimensional code.

The image information generation unit 24 generates image positional information such as a position of a partial image selected by the user, a file name, or the like for an image of a file displayed on the display unit 21. The image generation unit 25 generates the image from the image positional information. The setup memory unit 26 stores information related to setups such as a user name, a password, a group, and so on.

The data send unit 27 sends the conversational content of the chat, the image positional information, and so on. The data receipt unit 28 receives the conversational content of the chat, the image positional information, the comment information, the file, and so on. The file administration unit 29 stores or discards a cache of the received file. The image information generation unit 30 generates character string information such as the position of a character string selected by the user, a file name, or the like for the file displayed on the display unit 21. The message process unit 31 performs an internal processing of the conversational content (the message) of the received chat.

«Chat Server»

Figure 5:
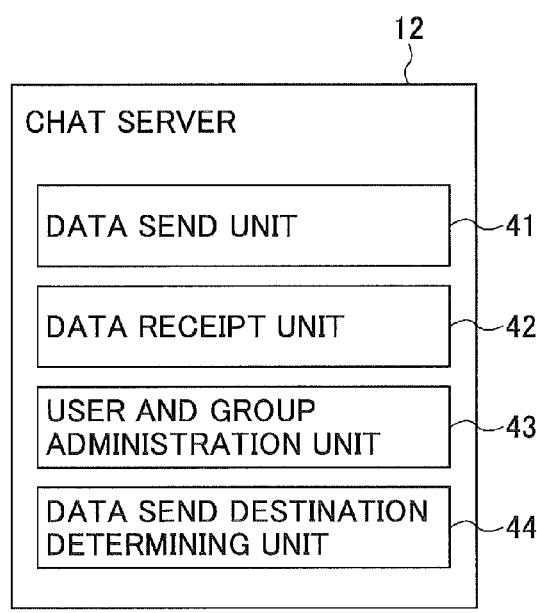
FIG. 5 is an exemplary processing block chart of a chat server of the embodiment.

The chat server 12 of the first embodiment is substantialized by a processing block illustrated in, for example, FIG. 5. FIG. 5 is an exemplary processing block chart of the chat server of the first embodiment. For example, the chat server 12 substantializes a data send unit 41, a data receipt unit 42, a user and group administration unit 43, and a data send destination determining unit 44 by executing the program.

The data send unit 41 outputs data such as the conversational content of the chat. The data receipt unit 42 receives data such as the conversational content of the chat. The user and group administrating unit 43 administers the user participating in the chat and a group to which the conversational content of the chat is sent. The data send destination determining unit 44 determines a group to which the conversational content of the chat is sent. The chat server 12 provides a chat function.

«Relay Server»

Figure 6:
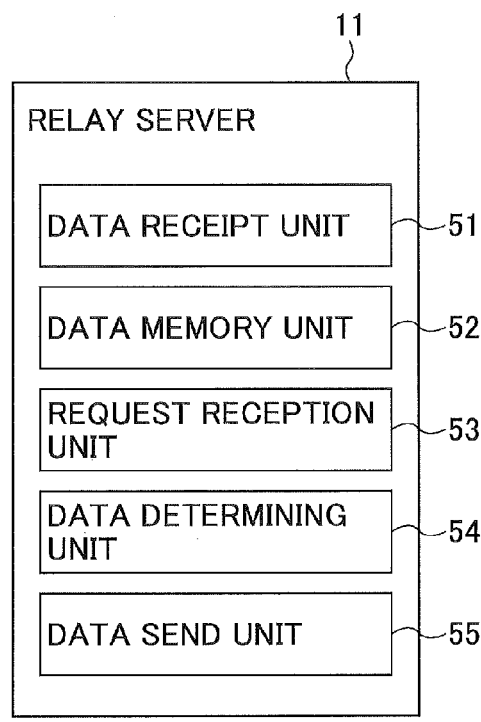
FIG. 6 is an exemplary processing block chart of a relay server of the embodiment.

The relay server 11 of the first embodiment is substantialized by the processing block illustrated in, for example, FIG. 6. FIG. 6 is an exemplary processing block chart of the relay server of the first embodiment. For example, the relay server 11 substantializes a data receipt unit 51, a data memory unit 52, a request reception unit 53, a data determining unit 54, and a data send unit 55 by executing a program.

For example, the data receipt unit 51 receives data from the PC 16 and the smart device 17, which are connected to the network N1, an apparatus ID of a send source of these data, and a file server ID of a send destination from the smart device 17 connected to the network N1. The data memory unit 52 stores various data received by the data receipt unit 51 while correlating the various data. The request reception unit 53 receives an inquiry of whether there is a request from the file server 14.

The data determining unit 54 determines whether the data associated with the file server ID of the file server 14, for which the request reception unit 53 receives an inquiry, are stored. When the data send unit 55 determines that the data are stored in the data determining unit 54, the data send unit 55 sends the data to the file server 14 for which the request reception unit 53 receives the inquiry.

«File Server»

Figure 7:
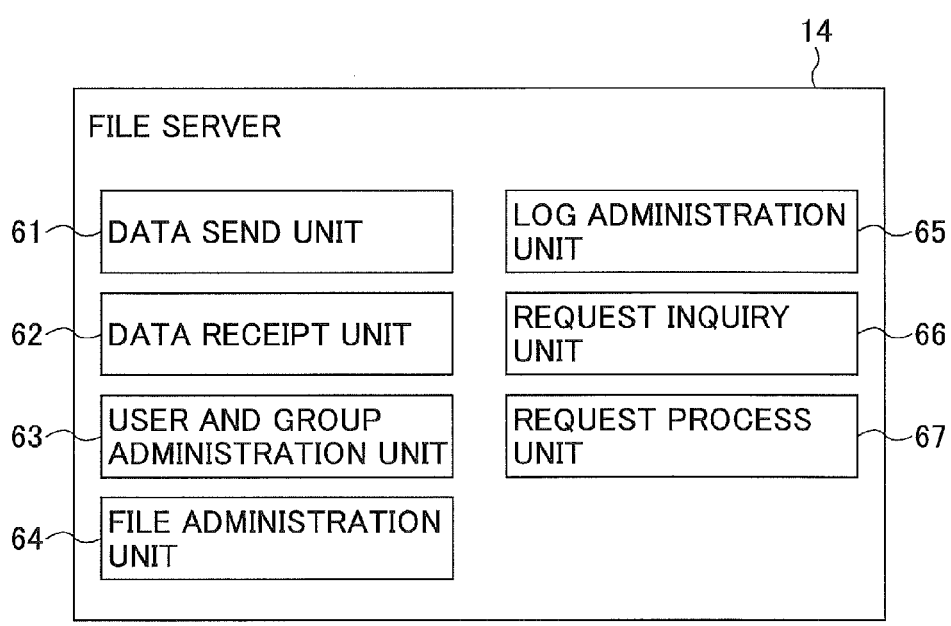
FIG. 7 is an exemplary processing block chart of a file server of the embodiment.

The file server 14 of the first embodiment is substantialized by a processing block illustrated in, for example, FIG. 7. FIG. 7 is an exemplary processing block chart of the file server of the first embodiment. For example, the file server 14 substantializes a data send unit 61, a data receipt unit 62, a user and group administration unit 63, a file administration unit 64, a log administration unit 65, a request inquiry unit 66, and a request process unit 67 by executing a program.

The data send unit 61 sends data such as a file or a result of processing a request. The data receipt unit 62 receives data such as the file, a log of the conversational content of the chat, a request received from the PC 16 and the smart device 17. The user and group administrating unit 63 administers the user participating in the chat and a group to which the conversational content of the chat is sent.

The file administration unit 64 stores the received file or reads the stored file. The log administration unit 65 stores the log of the conversational content of the chat. The request inquiry unit 66 inquires the relay server 11 of whether a request exists or not. The request process unit 67 processes the request based on the content of the request.

«Push Server»

Figure 8:
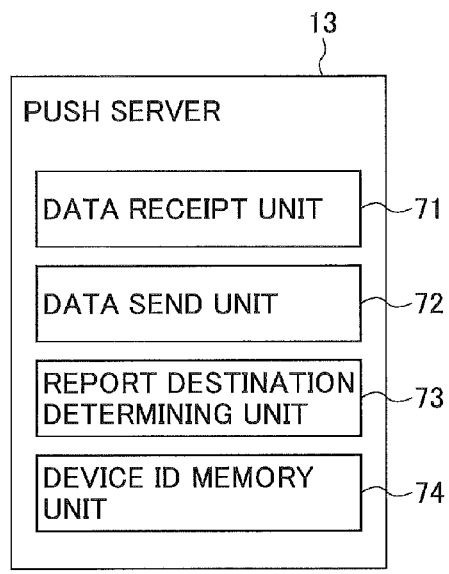
FIG. 8 is an exemplary processing block chart of a push server of the embodiment.

The push server 13 of the first embodiment is substantialized by a processing block illustrated in, for example, FIG. 8. FIG. 8 is an exemplary processing block chart of the push server of the first embodiment. For example, the push server 13 substantializes a data receipt unit 71, a data send unit 72, a report destination determining unit 73, and a device ID memory unit 74 by executing a program.

The data receipt unit 71 receives an already read report of a push report from the file server 14. The data send unit 72 requests a report destination determined by the report destination determining unit 73 to send the already read report of the push report. The report destination determining unit 73 determines a request source of the already read report of the push report based on push report destination information stored in the device ID memory unit 74. The device ID memory unit 74 stores push report destination information (described later) associating the user with the PC 16 or the smart device 17.

«PC»

Figure 9:
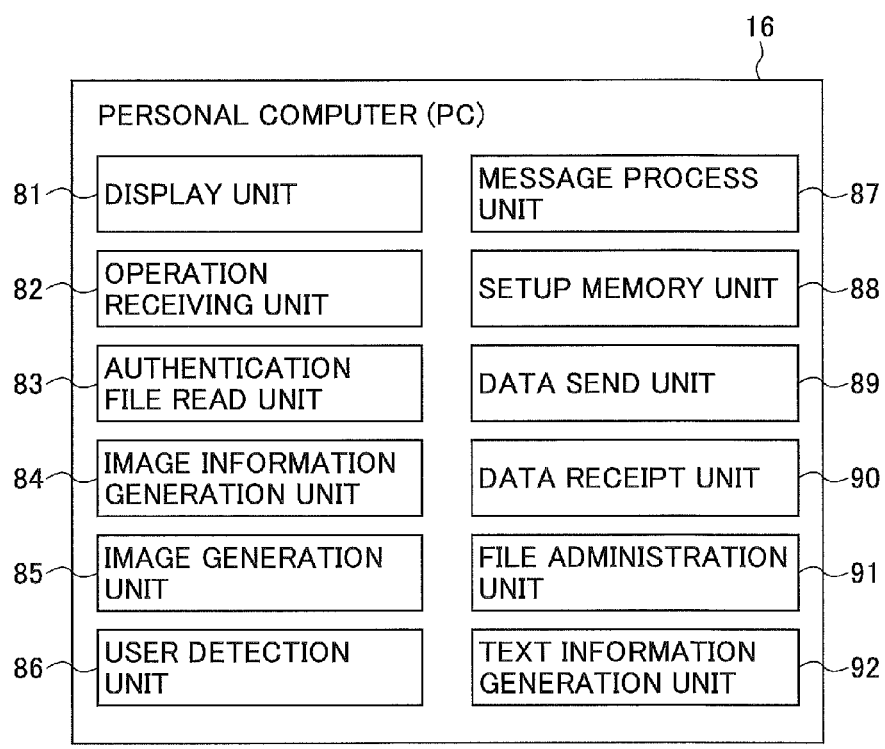
FIG. 9 is an exemplary processing block chart of a PC of the embodiment.

The PC 16 of the first embodiment is substantialized by the processing block illustrated in, for example, FIG. 9. FIG. 9 is an exemplary processing block chart of the PC of the first embodiment. For example, the PC 16 substantializes a display unit 81, an operation receiving unit 82, an authentication file read unit 83, an image information generation unit 84, an image generation unit 85, a user detection unit 86, a message process unit 87, a setup memory unit 88, a data send unit 89, a data receipt unit 90, a file administration unit 91, and a text information generation unit 92 by executing a program.

The display unit 81 displays the content of the file, the conversational content of the chat, a file selection screen, or the like. The operation receiving unit 82 receives an operation done by the user. The authentication file read unit 83 reads an authentication file for a device registration (described below).

The image information generation unit 84 generates image positional information such as a position of a partial image selected by the user, a file name, or the like for an image of the file displayed on the display unit 81. The image generation unit 85 generates the image from the image positional information.

The user detection unit 86 detects whether the user stays before the PC 16 (in front of the PC 16) when the conversational content of the chat is displayed on the display unit 81. The message process unit 87 performs an internal processing of the conversational content of the received chat. The setup memory unit 88 stores information related to setups such as the user name, the password, the group, and so on.

The data send unit 89 sends the conversational content of the chat, the image positional information, and so on. The data receipt unit 90 receives the conversational content of the chat, the image positional information, the file, and so on. The file administration unit 91 stores or discards a cache of the received file. The image information generation unit 92 generates character string information such as the position of a character string selected by the user, the file name, or the like for the file displayed on the display unit 81.

<Detailed Process>

Hereinafter, a detailed process of the information processing system 1 of the first embodiment is described.

«Apparatus Registration»

In the information processing system 1 of the embodiment, it is necessary to register the PC 16 or smart device 17 accessible to the file server 14. The registration of the apparatus of the PC 16 is described as an example. For example, in the information processing system 1, the PC 16 accessible to the file server 14 is registered (pairing) as follows.

FIG. 10 illustrates an exemplary image of WebUI acquiring the authentication file for the device registration. The user downloads the authentication file, which is provided for registering the PC 16 accessible to the file server 14, into the PC 16 required to be registered as a device accessible to the file server 14 from WebUI illustrated in FIG. 10.

The registration of the PC 16 is performed regardless of whether the PC 16 accesses through the relay server 11 or not. When the PC 16 reads the authentication file for the device registration, the PC 16 can acquire information (see FIG. 11) necessary for accessing the file server 14.

FIG. 11 is an exemplary structural view of the information acquired from the authentication file. For example, FIG. 11 illustrates exemplary information necessary to access the file server 14. Referring to FIG. 11, an ID and an IP address each inherent in the file server 14, an ID used when the access is through the relay server 11, and a link used for activation are included in the information.

FIG. 12 is an exemplary flowchart of a PC registration process. The PC 16 acquires a link used for activation illustrated in FIG. 11. This link is read from the authentication file in step S1. In step S2, the PC 16 accesses the link (the address for the activation) used for the activation while sending the apparatus ID of the PC 16.

In step S3, the PC 16 determines whether the registration to the file server 14 is completed by accessing the link used for the activation. In a case where the registration to the file server 14 is completed after accessing the link used for the activation, the PC 16 displays a screen of success as illustrated in FIG. 13 in step S4.

Figure 13:
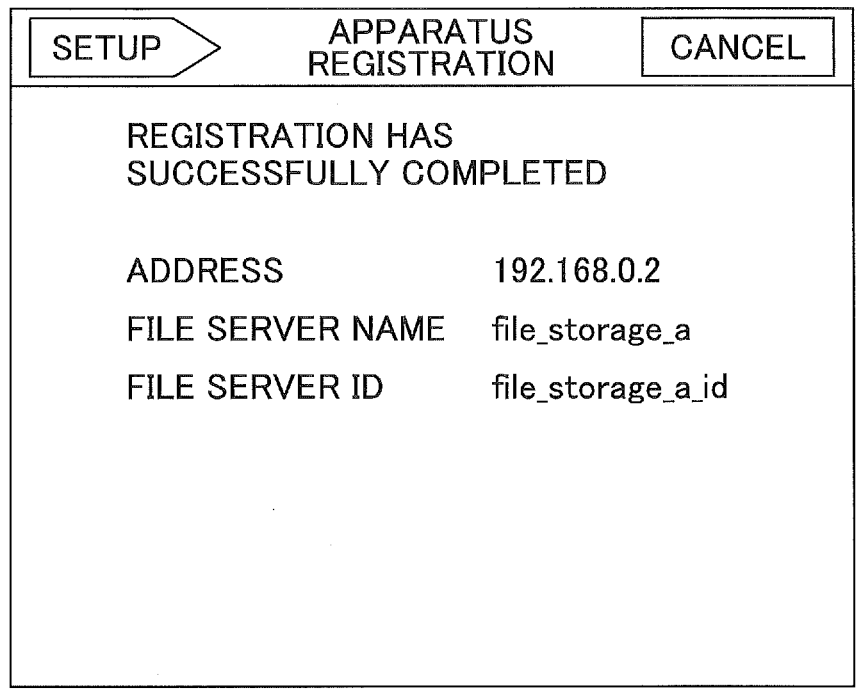
FIG. 13 is an exemplary image chart of a screen of success.

FIG. 13 illustrates an exemplary image of the screen of the success. The successful registration of the PC 16, the IP address of the file server 14 in which the PC 16 is registered, the file server name, and the file server ID are displayed on the screen of the success illustrated in FIG. 13.

In step S5 after step S4, the PC 16 stores information (access information for accessing the file server 14) necessary for accessing the file server 14. In a case where the registration to the file server 14 fails in step S3, the PC 16 displays a screen of failure in step S6.

The flowchart illustrated in FIG. 12 performs the activation based on the address of the activation acquired from the authentication file, registers information of the PC 16 into the file server 14, and registers information of the file server 14 into the PC 16.

The file server 14 does not permit the access from the PC 16 which is not provided with the PC registration process illustrated in FIG. 12. When the file server 14 is used from the PC 16, it is necessary to perform the PC registration process illustrated in FIG. 12. The PC 16 completing the PC registration process can take out the information and the file stored in the file server 14.

«Group Creation»

In the information processing system 1 of the embodiment, it is necessary to create a group sending the conversational content of the chat. For example, in the information processing system 1, a group sending the conversational content of the chat is created as described below. Described here is an exemplary process of creating the group from the PC 16.

Figure 14:
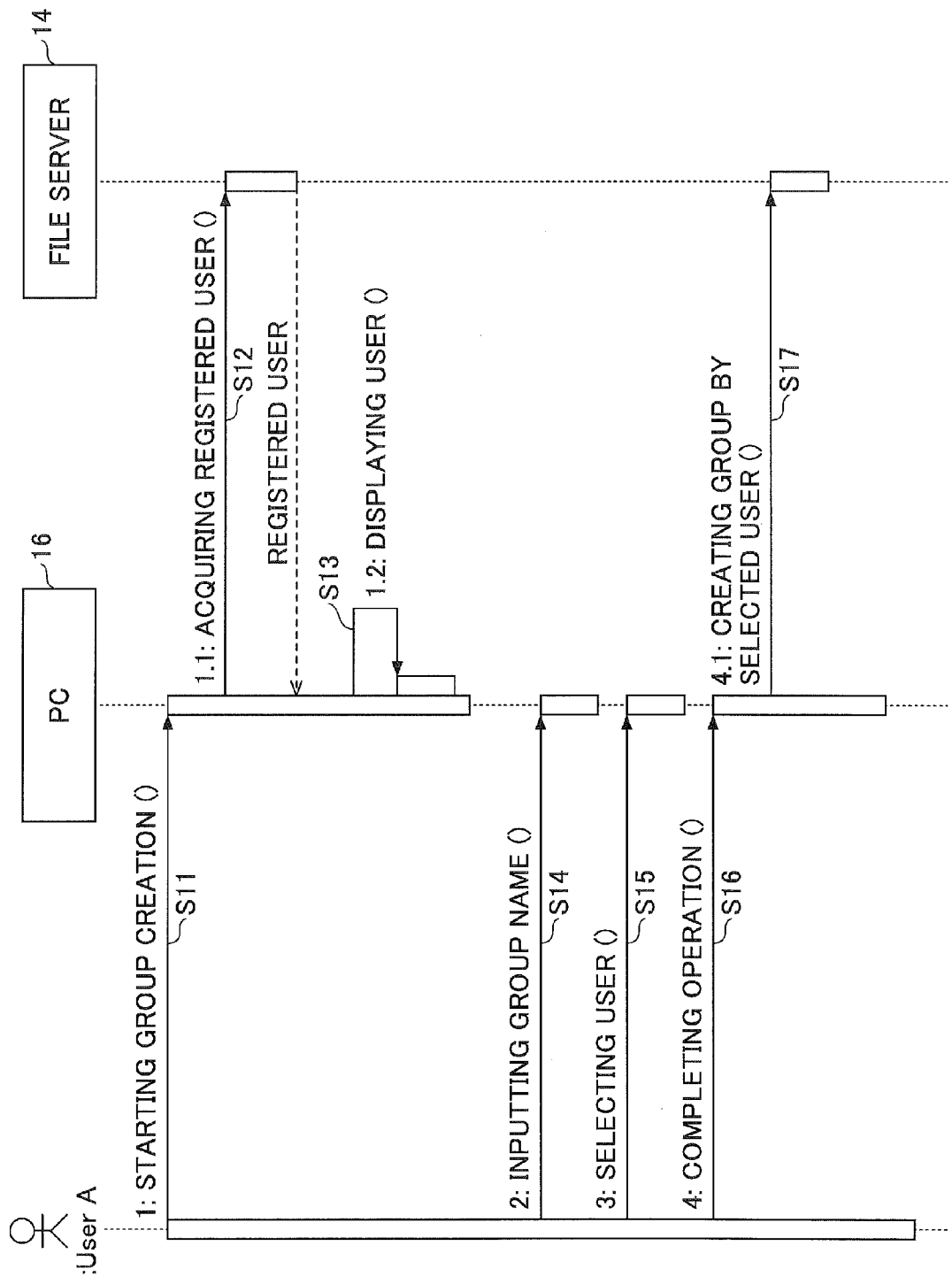
FIG. 14 is an exemplary sequence chart of a group creation process.

FIG. 14 is an exemplary sequence chart of the group creation process. The user operating the PC 16 instructs to start the group creation to the PC 16 in step S11. In step S12, the PC 16 requests the file server 14 to acquire a registered user who can participate in the chat. The file server 14 returns the information of the registered user to the PC 16.

Figure 15:
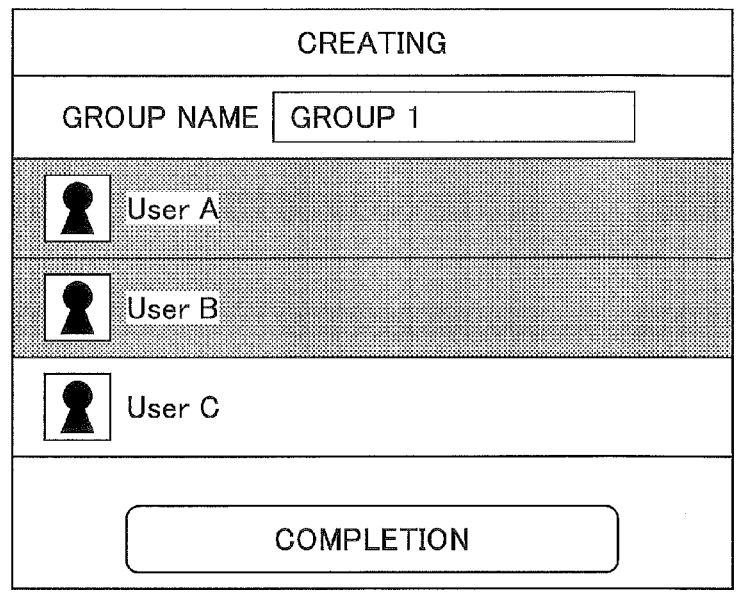
FIG. 15 illustrates an exemplary image of a group creation screen.

In step S13, the PC 16 displays a group creation screen as illustrated in FIG. 15 using the received information of the registered user. FIG. 15 illustrates an exemplary image of the group creation screen. The group creation screen is an exemplary screen displayed on the PC 16 for the group creation. In the group creation screen illustrated in FIG. 15, a column for inputting a group name and a column for selecting users are included.

In step S14, the user A operates the PC 16 and inputs the group name into the group creation screen. In step S15, the user operates the PC 16 and selects the user who is to participate in the group from the group creation screen. In step S16, the user operates the PC 16 and pushes a button of completion or the like to perform a completion operation.

After the completion operation is performed by the user, the process goes to step S17. The PC 16 requests the file server 14 to create the group using the group name input in step S14 and the users selected in step S15. The file server 14 requested to create the group creates the group using the group name input in step S14 and the users selected in step S15, and administers the users by mutually associating the users in the same group.

«Chat Process»

In the information processing system 1 of the embodiment, the chat is conducted between the PCs 16 and the smart devices 17 participating in the group. An exemplary screen displayed in the PC 16 is described.

Figure 16:
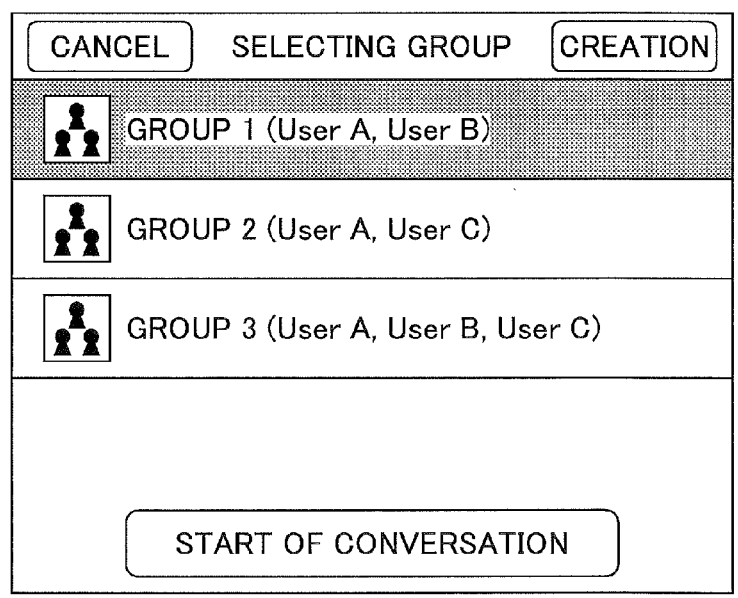
FIG. 16 illustrates an exemplary image of a group selection screen for performing a chat.

FIG. 16 illustrates an exemplary image of a group selection screen for performing a chat. The user selects the group, in which the chat is conducted, from the group selection screen as illustrated in FIG. 16 and pushes a button of "start of conversation". Information of the groups displayed on the group selection screen can be acquired from the chat server 14. When the button of "start of conversation" is pushed, the PC 16 reports the group, in which the chat is conducted and which is selected from the group selection screen, to the chat server 12.

Figure 17:
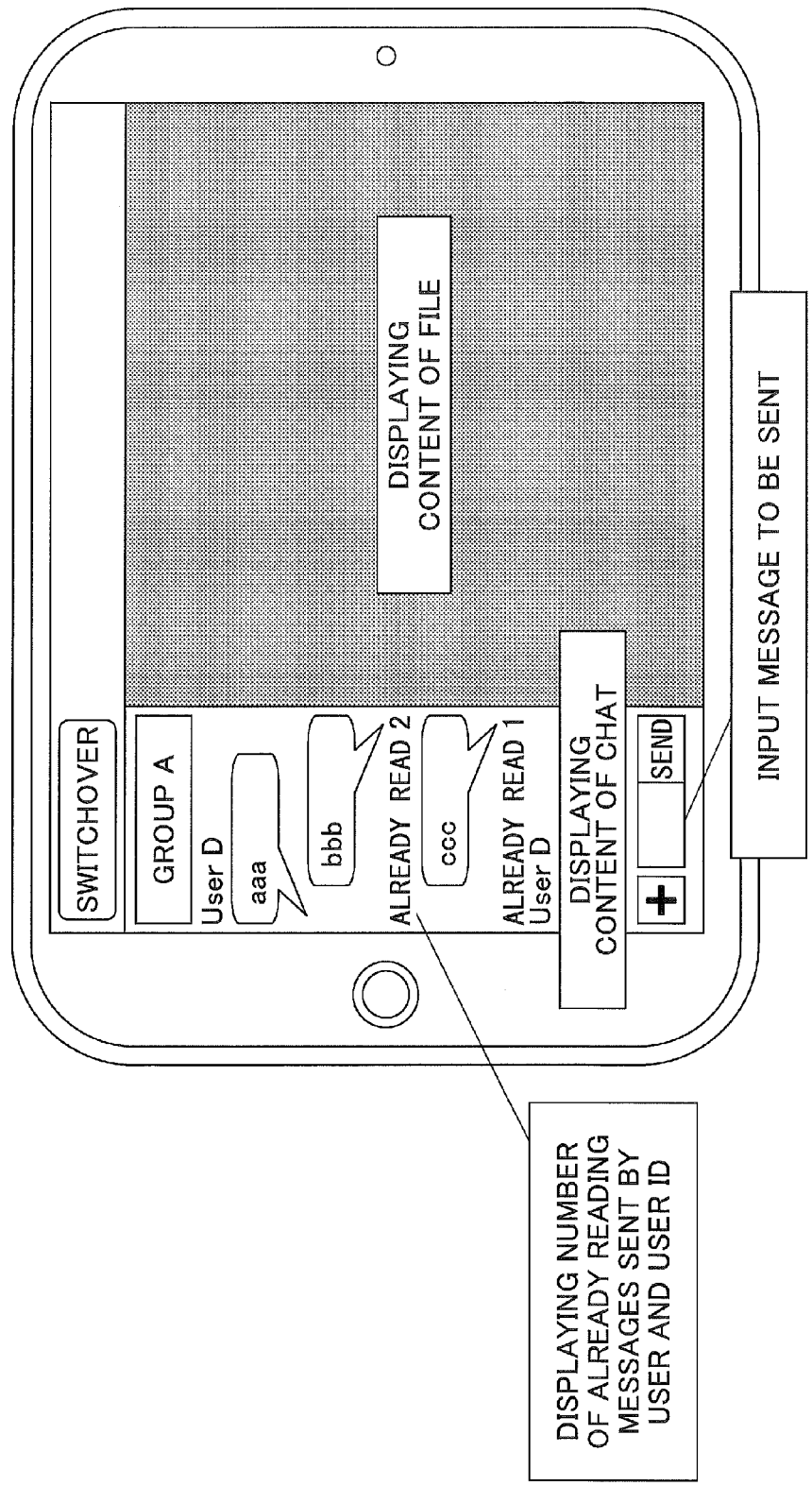
FIG. 17 is an exemplary image chart of a chat screen displayed on the smart device.
Figure 18:
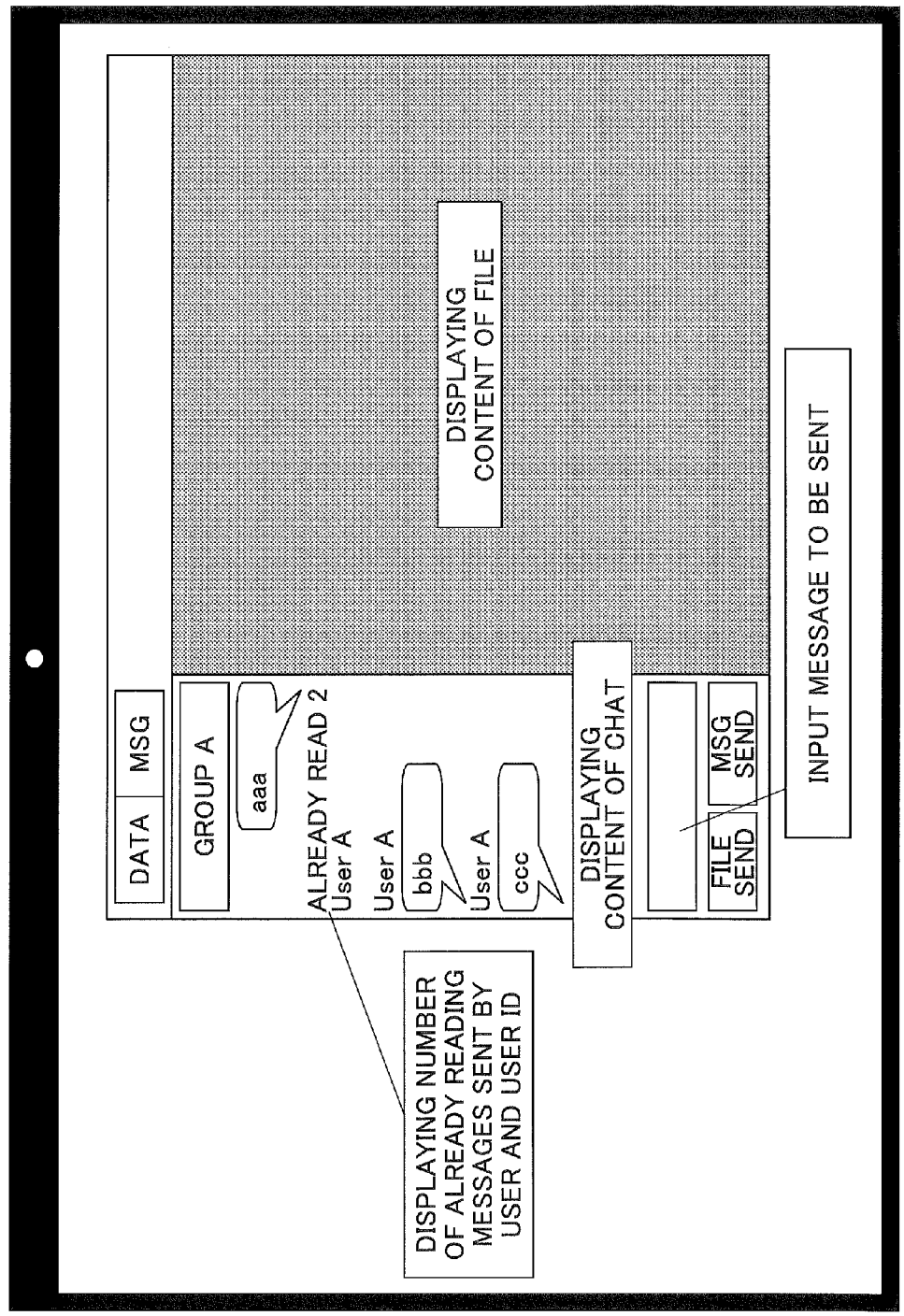
FIG. 18 is an exemplary image chart of a chat screen displayed on the PC.

A chat screen as illustrated in, for example, FIG. 17 is displayed on the smart device 17 operated by the user belonging to the group where the chat is conducted. A chat screen as illustrated in, for example, FIG. 18 is displayed on the PC 16 operated by the user belonging to the group where the chat is conducted. FIG. 17 is an exemplary image chart of the chat screen displayed on the smart device. FIG. 18 is an exemplary image chart of the chat screen displayed on the PC.

On the chat screen illustrated in FIGS. 17 and 18, the conversational content of the chat is displayed on the left side of the chat screen and a box for inputting a message to be sent is arranged below an area where the conversational content is displayed. The content of the file selected by the user is displayed on the right side of the chat screens illustrated in FIGS. 17 and 18.

On a part displaying the conversational content of the chat of the chat screens illustrated in FIGS. 17 and 18, a left side displays a message sent by the other user and a right side displays a message sent by the user operating the smart device 17. The message sent by the user operating the smart device 17 includes a display the number (the number of already reading the message) of the other users in the group who browses the message. On the part displaying the conversational content of the chat of the chat screens illustrated in FIGS. 17 and 18, a user ID of the user who has already read the conversational content of the chat is displayed when the number of already reading the message is tapped.

A "data" tab for switching to a display of a screen of displaying a file view of the file server 14 is provided on the chat screen illustrated in FIG. 18. The chat screen illustrated in FIG. 18 displays a state where a "MSG" tab is selected.

When the "data" tab located above the chat screen is pushed, the PC 16 acquires a file view from the file server 14 and displays the file selection screen. The user can cause the content of the selected file to be displayed on the chat screen by selecting a file whose content is required to be displayed from the file view displayed on the file selection screen and pushing the selection button.

«Message Delivery Process»

Figure 19:
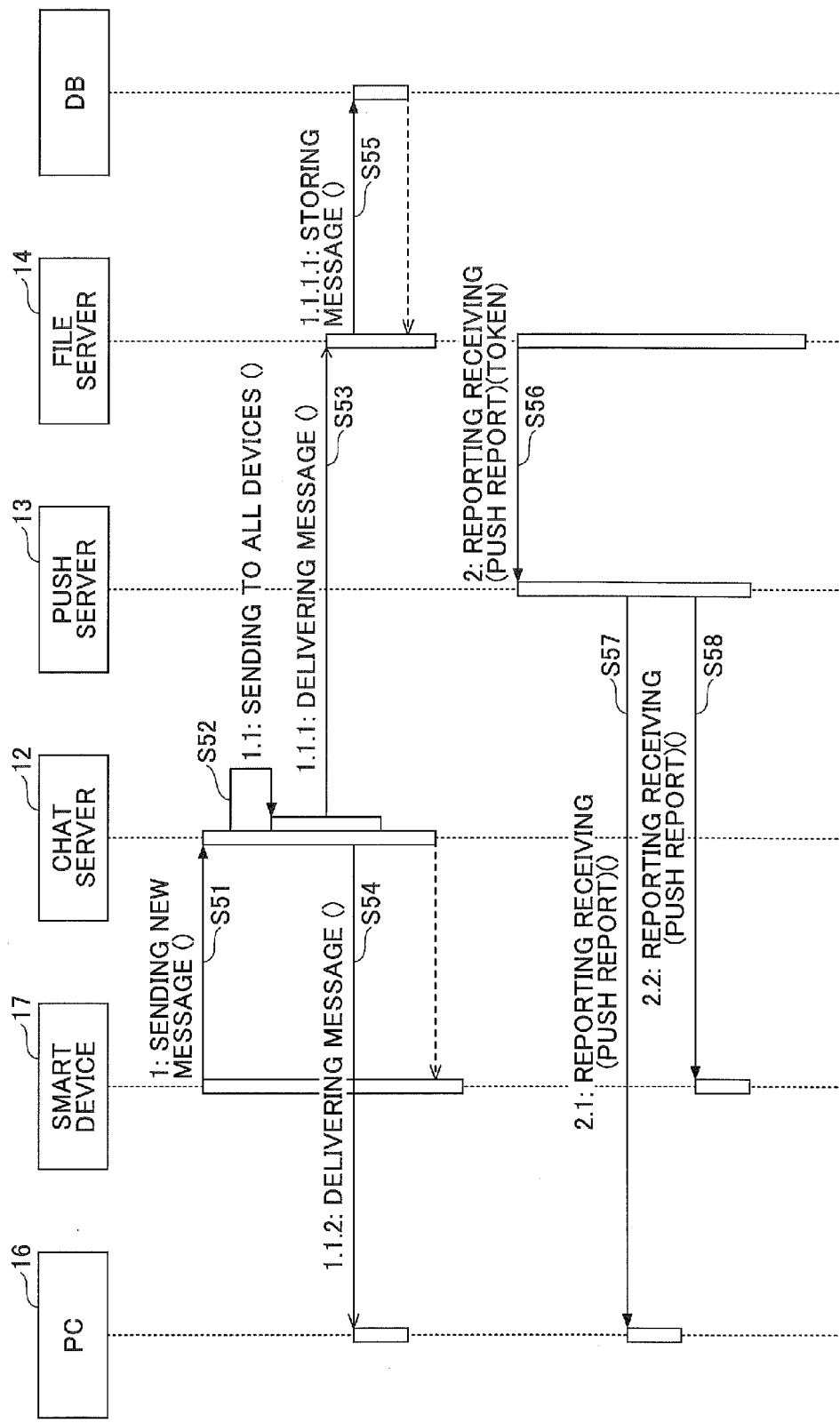
FIG. 19 is an exemplary sequence chart of a message delivery process.

The information processing system 1 of the first embodiment performs a message delivery process as illustrated in, for example, FIG. 19. FIG. 19 is an exemplary sequence chart of a message delivery process. In the sequence chart illustrated in FIG. 19, illustrated is an example where a new message input by the user to the smart device 17 is delivered to the PC 16.

In step S51, the smart device 17 sends the new message input by the user to the chat server 12. In step S52, the chat server 12 refers to the group information illustrated in, for example, FIG. 20 and determines a delivery destination of the message. FIG. 20 illustrates a structure of exemplary group information.

The group information illustrated in FIG. 20 associates a group ID with a group name and an attending user ID. The group ID is exemplary identification information for identifying groups where chats are performed. The group name is an exemplary name of the group where the chats are performed. The attending user ID is a user ID of a user belonging to the group identified by the group ID. The chat server can determine the delivery destination of the message in which the group ID is designated by referring to the group information illustrated in FIG. 20.

In step S53, the chat server 12 sends the message to the file server 14. In step S54, the chat server 12 sends the message to the PC 16. The chat server 12 uses the relay server 11 when the message is sent to the file server 14 and the PC 1612, which are connected to the network N2. The PC 16 receiving the delivery of the message displays the message on the chat screen illustrated in, for example, FIG. 18.

The file server 14 receiving the delivery of the message stores message log information (see FIG. 21) and the message in step S55. FIG. 21 illustrates a structure of exemplary message log information.

The message log information illustrated in FIG. 21 associates a message ID with an attending group, a remarking person, a remarked time, and an already read user ID. The message ID is an exemplary identification information for identifying the messages. The attending group is the group ID of the group in which the message is remarked (posted). The remarking person ID is the user ID of the user who has remarked (posted) the message. The remarked time (a posted time) is a time when a remark (posting) is done. The already read user ID is the user ID of the user who browses the message.

In step S56, the file server 14 requests the push server 13 to report an already read report of the push report to the push server 13. The push server 13 refers to push report destination information as illustrated in FIG. 22 and determines the apparatus ID of the apparatus corresponding to the user on the delivery destination of the message. In the sequence chart illustrated in FIG. 19, the PC 16 and the smart device 17 are selected as the apparatus corresponding to the user at the delivery destination of the message.

In step S57, the push server 13 requests the PC 16 to report the already read report of the push report. In step S58, the push server 13 requests the smart device 17 to report the already read report of the push report. By the processes of steps S57 and S58, the PC 16 and the smart device 17 reports the already read report to the file server 14 in a case where it is determined that the message has been referred to.

«Already Read Report Process»

Figure 23:
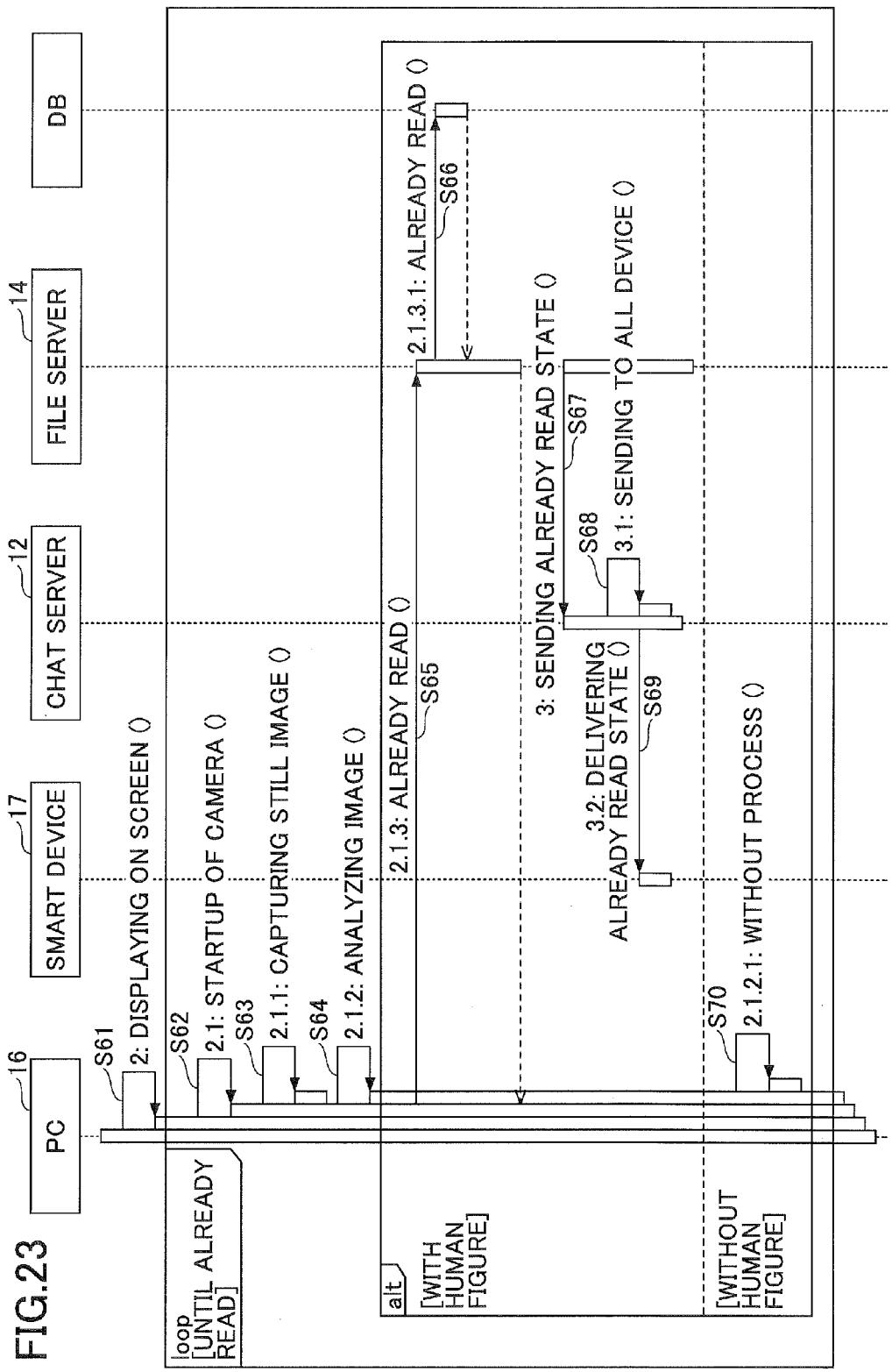
FIG. 23 is an exemplary sequence chart of an already read report process.

The information processing system 1 of the first embodiment performs an already read report process as illustrated in, for example, FIG. 23. FIG. 23 is a sequence chart of an exemplary already read report process.

In step S61, the PC 16 displays the message delivered from the chat server 12. In step S62, a user detection unit 86 of the PC 16 starts up a camera 509. In step S63, the user detection unit 86 controls the camera 509 to capture a still image. In step S64, the user detection unit 86 performs an image analysis of the still image to determine whether a human figure exists in the still image (whether the user exist before the PC 16).

If it is determined that the human figure exists in the still image, the message process unit 87 reports the already read report to the file server 14 in step S65. In step S66, the file server 14 adds the user ID of the user operating the PC 16 to the already read user ID in the message log information illustrated in FIG. 21.

In step S67, the file server 14 sends information indicative of an already read state (a browsed state) to the chat server 12. In step S68, the chat server 12 refers to the group information as illustrated in FIG. 20 and selects the smart device 17 as the delivery destination of the information indicative of the already read state. In step S69, the chat server 12 delivers the information indicative of the already read state to the smart device 17.

If it is determined that the human figure does not exist in the still image in step S64, the message process unit 87 does not report the already read report in step S70. The message process unit 87 of the PC 16 repeats the processes on or after step S62 until the already read report is sent.

As described, even though the message process unit 87 of the PC 16 displays the message, the already read report is not sent in a case where it is determined that the user does not exist before the PC 16. Therefore, it is possible to enhance an accuracy of the already read report in the information processing system 1 of the first embodiment.

Hereinafter, the already read report process in the PC 16 receiving the message from the chat server 12 is further described.

Figure 24:
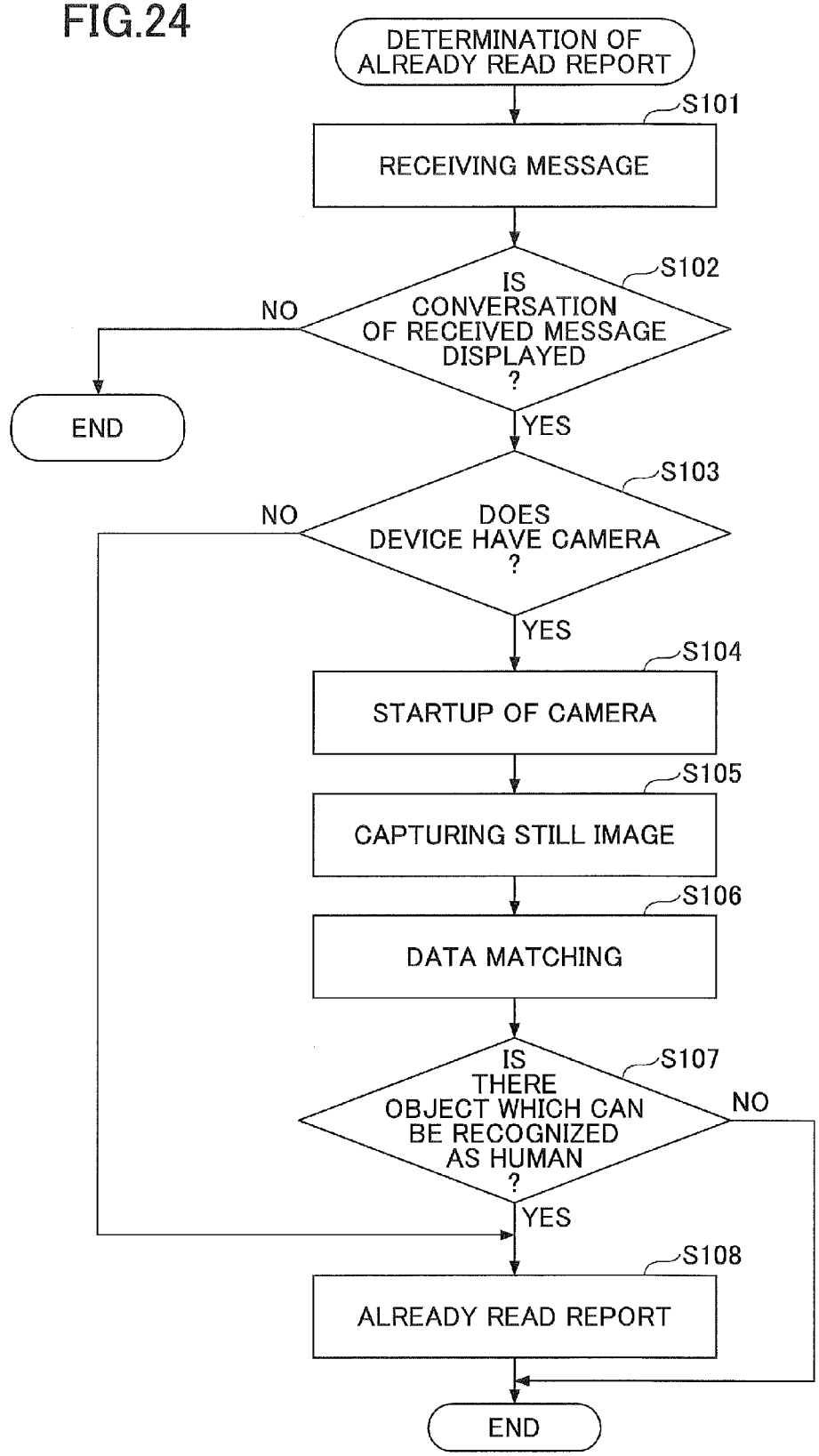
FIG. 24 is an exemplary flow chart of the already read report process.

FIG. 24 is an exemplary flow chart of the already read report process. In step S101, the PC 16 receives the message delivered from the chat server 12. In step S102, the message process unit 87 determines whether the conversational content in the group where the message is received is displayed.

When the conversational content is not displayed, the message process unit 87 treats the received message as being unread. Therefore, the process of the flowchart illustrated in FIG. 24 ends. When the conversational content is displayed, the message process unit 87 performs an already read determination process.

In step S103, the user detection unit 86 determines that the camera 509 is attached to the PC 16. If the camera 509 is not attached, the user detection unit 86 reports to the message process unit 87 that the camera 509 is not attached. The message process unit 87 reported that the camera 509 is not attached reports the already read report to the file server 14 and ends the process of the flowchart illustrated in FIG. 24.

If the camera 509 is attached to the PC 16, the user detection unit 86 starts up the camera 509 in step S104. In step S105, the user detection unit 86 controls the camera 509 to capture a still image. In step S106, the user detection unit 86 performs an image analysis of a captured still image to determine by data matching whether there is an object which can be recognized as a human before the camera (in front of the camera).

In a case where it is determined that there is the object which can be recognized as the human, the user detection unit 86 reports to the message process unit 87 that the user is detected. The message process unit 87 reported that the user is detected reports the already read report to the file server 14 in step S108 and ends the process of the flowchart illustrated in FIG. 24.

In the case where it is determined that there is not the object which can be recognized as the human, the user detection unit 86 reports to the message process unit 87 that the user is not detected. The message process unit 87 reported that the user is not detected ends the process of the flowchart illustrated in FIG. 24 so as to treat the received message as an unread message.

Referring to FIG. 24, it is determined whether the user exists before the PC 16 using the image analysis of the still image captured by the camera 509. The determination of whether the user exists before the PC 16 may be performed as described in, for example, FIG. 25.

Figure 25:
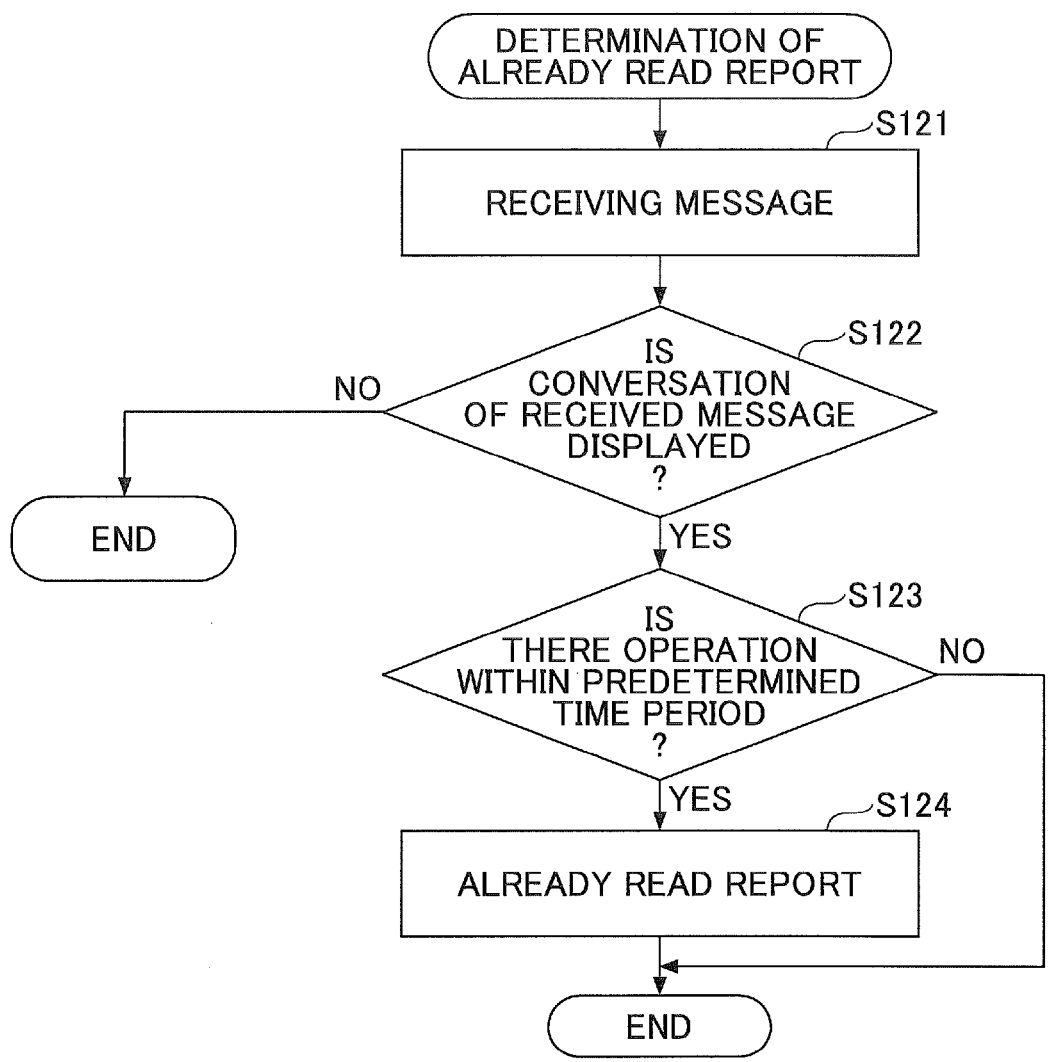
FIG. 25 is another exemplary flow chart of another already read report process.

FIG. 25 is a flow chart of another exemplary already read report process. The processes of steps S121 to S122 are similar to the processes of steps S101 to S102 of FIG. 24. In a case where the conversational content in the group where the message is received is displayed in step S122, the message process unit 87 performs the already read determination process using the input device 501 on or after step S123.

In step S123, the user detection unit 86 determines whether the user operates the PC 16 within a predetermined time period. If the user does not operate the PC 16 within the predetermined time period, the user detection unit 86 reports to the message process unit 87 that the user is not detected. The message process unit 87 reported that the user is not detected ends the process of the flowchart illustrated in FIG. 25 so as to treat the received message as the unread message.

If the user operates the PC 16 within the predetermined time period, the user detection unit 86 reports to the message process unit 87 that the user is detected. The message process unit 87 reported that the user is detected reports the already read report to the file server 14 in step S124 and ends the process of the flowchart illustrated in FIG. 25.

Figure 26:
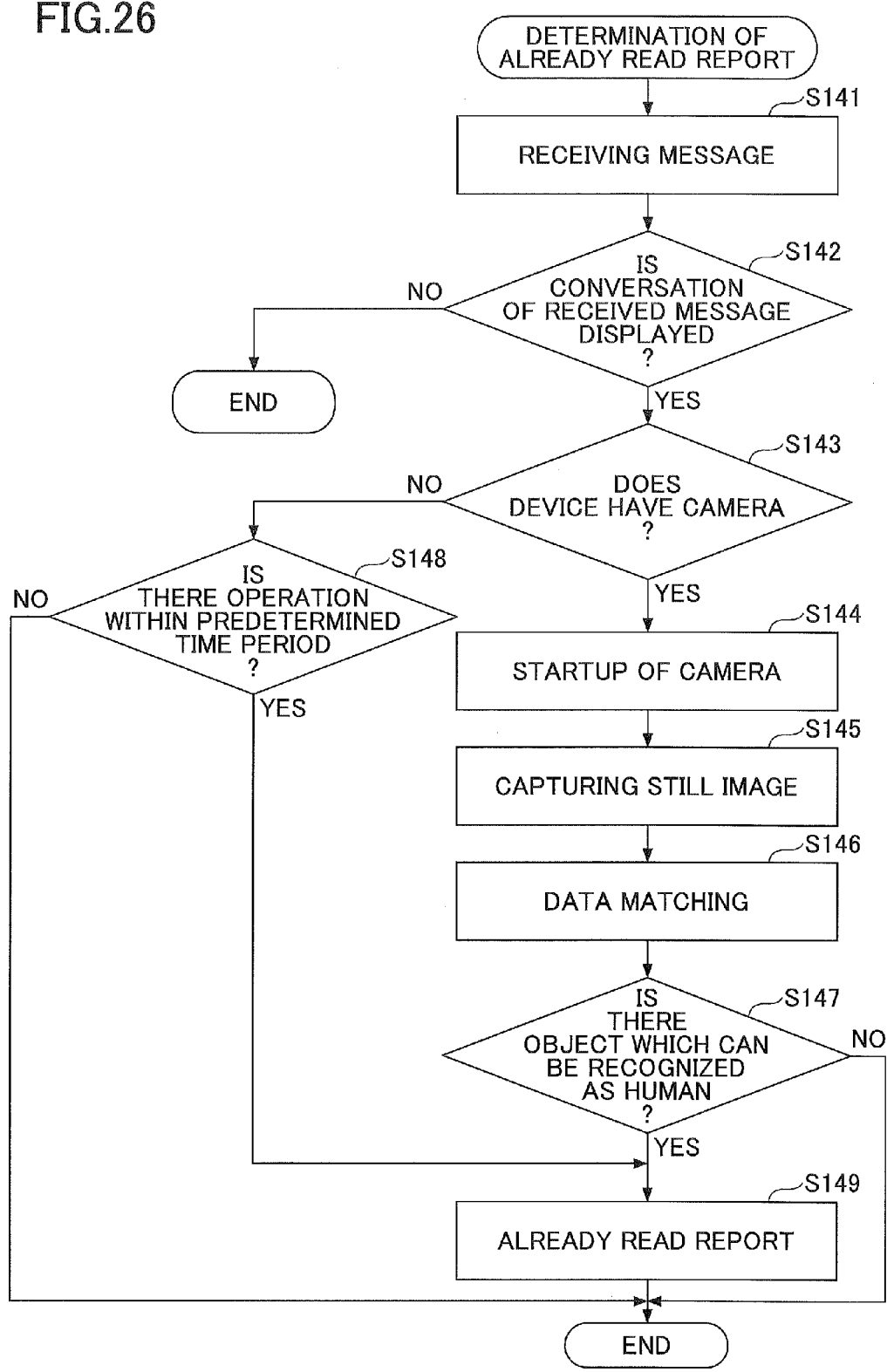
FIG. 26 is another exemplary flow chart of the already read report process.

The determinations of whether the user exists before the PC 16 as illustrated in FIGS. 24 and 25 may be performed by combining these as illustrated in FIG. 26. FIG. 26 is a flow chart of another exemplary already read report process. In the flowchart illustrated in FIG. 26, processes on or after step S123 illustrated in FIG. 25 are performed in a case where the camera 509 is not attached in step S103 of FIG. 24.

In the already read report process illustrated in FIG. 26, the determination of whether the user exists before the PC 16 is done by the determination using the image analysis of the still image captured by the camera 509 and the determination of whether the user operates the PC 16 within the predetermined time period. Therefore, the accuracy of the already read report can be further enhanced.

<Another System Structure>

Figure 27:
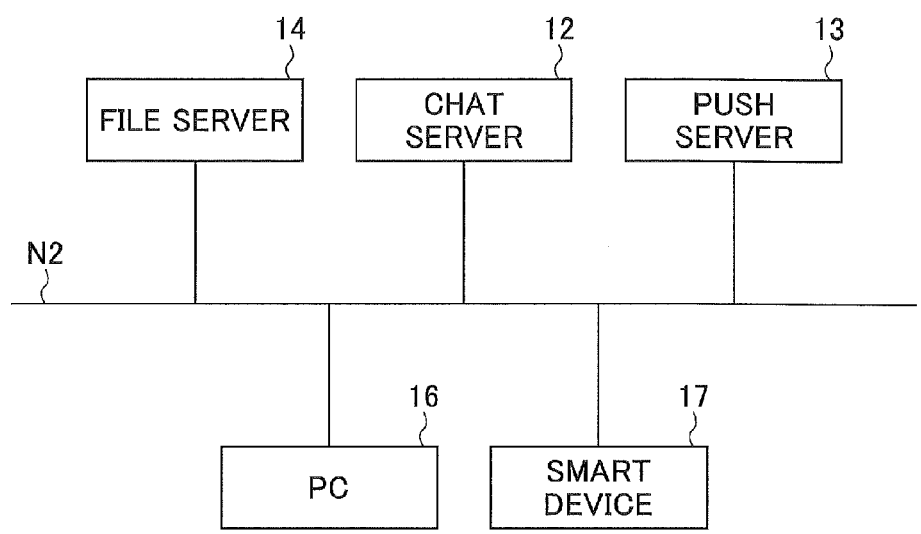
FIG. 27 illustrates another exemplary structure of the information processing system of the embodiment.

The structure of the information processing system 1 illustrated in FIG. 1 is an example and may be as illustrated in FIG. 27. FIG. 27 illustrates another exemplary structure of the information processing system of the first embodiment.

In an information processing system 1A illustrated in FIG. 27, a chat server 12, a push server 13, a file server 14, a PC 16, and a smart device 17 are connected to a network N2 such as a LAN. Because the information processing system 1A illustrated in FIG. 27 does not communicate beyond the FW 15, the relay server 11 is omitted. By the information processing system 1A illustrated in FIG. 27, a process similar to that in the above information processing system 1 can be performed. In the information processing system 1A illustrated in FIG. 27, the chat server 12, the push server 13, and the file server 14 may be integrated.

<General Overview>

Within the first embodiment, even if the message is displayed in the PC 16, the already read report is not sent in the case where it is determined that the user does not exist before the PC 16. Therefore, it is possible to enhance the accuracy of the already read report.

The file server 14 is an example of a file storage apparatus recited in claims. The chat server 12 is an example of a delivery device or a delivery unit 12 each recited in claims. The PC 16 and the smart device 17 are an example of a terminal apparatus recited in the claims. The display unit 81 is an example of a display unit recited in the claims. The user detection unit 86 is an example of a user detection unit recited in the claims. The message process unit 87 is an example of a report unit recited in the claims and is an example of a display control unit in the claims.

The embodiment does not limit the scope of the present invention. The present invention is not limited to the structures illustrated in FIGS. 1 and 27. For example, the information processing system 1 or 1A can be formed by at least one information processing apparatus. Any one of at least one information processing apparatus may have the above described function.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

This application is based upon and claims the benefit of priority of the prior Japanese Patent Application No. 2014-198511, filed on Sep. 29, 2014, the entire contents of which are incorporated herein by reference.

What is claimed is:

1. An information processing system comprising:
a plurality of terminal apparatuses; and
at least one information processing apparatus that is connected with the plurality of terminal apparatuses, wherein
the at least one information processing apparatus includes an information delivery server configured to deliver information, which is used by a user and received from a first terminal apparatus from among the plurality of terminal apparatuses, to one or more other terminal apparatuses that are associated with the first terminal apparatus, and
each of the plurality of terminal apparatuses includes:
a processor, and
a memory storing program instructions that cause the processor to
receive the information delivered by the information delivery server between the plurality of terminal apparatuses;
determine whether content of the received information is displayed on a display of the one or more other terminal apparatuses;
determine whether the one or more other terminal apparatuses include an image-capturing device;
determine whether the user is present in front of the one or more other terminal apparatuses at which it is determined that the content of the received information is displayed;
send a report, indicating that the received information has been browsed from the one or more other terminal apparatuses at which the processor determines that the content of the received information is displayed on the display of the one or more other terminal apparatuses, and the user is present, to the at least one information processing apparatus, and not send the report from the one or more other terminal apparatuses at which the processor determines that the content of the received information is displayed on the display of the one or more other terminal apparatuses, and the user is not present, to the at least one information processing apparatus, the information indicating that the first terminal apparatus browses the received information being received from the at least one information processing apparatus; and
display a browsed state of the received information in the one or more other terminal apparatuses based on the report received from the one or more other terminal apparatuses, wherein the browsed state is displayed upon receipt from the at least one information processing apparatus of the information indicating that the first terminal apparatus browses the received information, wherein
in a case where the processor determines that the one or more other terminal apparatuses include an image capturing device, the processor controls the image capturing device to capture image data before the one or more other terminal apparatuses, and determines whether the user is present in front of the one or more other terminal apparatuses based on an image analysis of the captured image data, and
in a case where the processor determines that the one or more other terminal apparatuses do not include the image capturing device, the processor determines whether the user is present in front of the one or more other terminal apparatuses based on whether the user operates the one or more other terminal apparatuses within a predetermined time.

2. The information processing system according to claim 1, wherein
the execution of the program instructions further causes the processor to
control the image capturing device to capture image data before the one or more other terminal apparatuses in a case where the information delivered by the information delivery server is received, and
determine whether the user is present in front of the one or more other terminal apparatuses based on an image analysis of the captured image data.

3. The information processing system according to claim 1, wherein execution of the program instructions further causes the processor to:
determine whether the user operates the one or more other terminal apparatuses within an predetermined time, and
in a case where the user operates the one or more other terminal apparatuses within the predetermined time, the processor determines that the user is present in front of the one or more other terminal apparatuses, and in a case where the user does not operate the one or more other terminal apparatuses within the predetermined time, the processor determines that the user is not present in front of the one or more other terminal apparatuses.

4. The information processing system according to claim 1,
wherein the information delivery server delivers the information received from the first terminal apparatus used by another user to the one or more other terminal apparatuses operated by the user using a chat function, the user using a chat function is associated with the another user as belonging to a group.

5. A terminal apparatus used in an information processing system formed by connecting at least one information processing apparatus with a plurality of terminal apparatuses, each terminal apparatus of the plurality of terminal apparatuses comprising:
a processor, and
a memory configured to store program instructions that, when executed by the processor, cause the processor to
receive information exchanged between the plurality of terminal apparatuses that is delivered by an information delivery server configured to deliver the information, which is used by a user and received from a first terminal apparatus from among the plurality of terminal apparatuses, to one or more other terminal apparatuses, which are associated with the first terminal apparatus;
determine whether content of the received information is displayed on a display of the one or more other terminal apparatuses;
determine whether the one or more other terminal apparatuses include an image-capturing device;
determine whether the user is present in front of the one or more other terminal apparatuses at which it is determined that the content of the received information is displayed;
send a report indicating that the received information has been browsed from the one or more other terminal apparatuses at which the processor determines that the content of the received information is displayed on the display of the one or more other terminal apparatuses, and the user is present, to the at least one information processing apparatus and not send the report from the one or more other terminal apparatuses at which the processor determines that the content of the received information is displayed on the display of the one or more other terminal apparatuses, and the user is not present, to the at least one information processing apparatus, the information indicating that the first terminal apparatus browses the received information being received from the at least one information processing apparatus; and
display a browsed state of the received information in the one or more other terminal apparatuses based on the report received from the one or more other terminal apparatuses, wherein the browsed state is displayed upon receipt from the at least one information processing apparatus of the information indicating that the first terminal apparatus browses the received information, wherein
in a case where the processor determines that the one or more other terminal apparatuses include an image capturing device, the processor controls the image capturing device to capture image data before the one or more other terminal apparatuses, and determines whether the user is present in front of the one or more other terminal apparatuses based on an image analysis of the captured image data, and
in a case where the processor determines that the one or more other terminal apparatuses do not include the image capturing device, the processor determines whether the user is present in front of the one or more other terminal apparatuses based on whether the user operates the one or more other terminal apparatuses within a predetermined time.

6. A computer-readable, non-transitory recording medium storing a program thereon that is executable by a processor to perform as a terminal apparatus used in an information processing system formed by connecting at least one information processing apparatus with a plurality of terminal apparatuses, the program, when executed, causing the computer to perform processes of:
receiving information exchanged between the plurality of terminal apparatuses that is delivered by an information delivery server configured to deliver the information, which is used by a user and received from a first terminal apparatus from among the plurality of terminal apparatuses, to one or more other terminal apparatuses, which are associated with the first terminal apparatus;
determining whether content of the received information is displayed on a display of the one or more other terminal apparatuses;
determine whether the one or more other terminal apparatuses include an image-capturing device;
determining whether the user is present in front of the one or more other terminal apparatuses at which it is determined that the content of the received information is displayed;
sending a report indicating that the received information has been browsed from the one or more other terminal apparatuses at which the processor determines that the content of the received information is displayed on the display of the one or more other terminal apparatuses, and the user is present, to the at least one information processing apparatus and not sending the report from the one or more other terminal apparatuses at which the processor determines the content of the received information is displayed on the display of the one or more other terminal apparatuses, and that the user is not present, to the at least one information processing apparatus, the information indicating that the first terminal apparatus browses the received information being received from the at least one information processing apparatus; and
displaying a browsed state of the received information in the one or more other terminal apparatuses based on the report received from the one or more other terminal apparatuses, wherein the browsed state is displayed upon receipt from the at least one information processing apparatus of the information indicating that the first terminal apparatus browses the received information, wherein
in a case where the processor determines that the one or more other terminal apparatuses include an image capturing device, the processor controls the image capturing device to capture image data before the one or more other terminal apparatuses, and determines whether the user is present in front of the one or more other terminal apparatuses based on an image analysis of the captured image data, and in a case where the processor determines that the one or more other terminal apparatuses do not include the image capturing device, the processor determines whether the user is present in front of the one or more other terminal apparatuses based on whether the user operates the one or more other terminal apparatuses within a predetermined time.

\* \* \* \* \*